United States Patent
Rämö et al.

(10) Patent No.: US 11,773,334 B2
(45) Date of Patent: Oct. 3, 2023

(54) METHOD FOR PRODUCING A MIXTURE OF HYDROCARBONS

(71) Applicant: Neste Oyj, Espoo (FI)

(72) Inventors: Virpi Rämö, Porvoo (FI); Antti Ojala, Porvoo (FI); Risto Vapola, Porvoo (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 17/836,592

(22) Filed: Jun. 9, 2022

(65) Prior Publication Data

US 2022/0298425 A1 Sep. 22, 2022

Related U.S. Application Data

(62) Division of application No. 17/045,883, filed as application No. PCT/FI2019/050281 on Apr. 8, 2019, now Pat. No. 11,384,292.

(30) Foreign Application Priority Data

Apr. 10, 2018 (FI) ..................................... 20185344

(51) Int. Cl.
   *C10G 9/36* (2006.01)
   *C10G 3/00* (2006.01)
   *C10G 47/00* (2006.01)
   *C10G 63/04* (2006.01)

(52) U.S. Cl.
   CPC ................ *C10G 9/36* (2013.01); *C10G 3/00* (2013.01); *C10G 47/00* (2013.01); *C10G 63/04* (2013.01); *C10G 2300/1044* (2013.01); *C10G 2300/1081* (2013.01); *C10G 2300/301* (2013.01); *C10G 2300/304* (2013.01); *C10G 2300/308* (2013.01)

(58) Field of Classification Search
   None
   See application file for complete search history.

(56) References Cited

U.S. PATENT DOCUMENTS

| | | | |
|---|---|---|---|
| 3,308,053 A * | 3/1967 | Kelly | C10L 1/04 585/323 |
| 5,284,985 A | 2/1994 | Girgis et al. | |
| 6,096,690 A | 8/2000 | Wittenbrink et al. | |
| 2002/0055663 A1 | 5/2002 | Barnes et al. | |
| 2006/0089518 A1 | 4/2006 | Bouvart et al. | |
| 2007/0249739 A1* | 10/2007 | Dierickx | C07C 4/02 518/703 |

(Continued)

FOREIGN PATENT DOCUMENTS

| | | |
|---|---|---|
| EP | 1741768 A1 | 1/2007 |
| EP | 2290035 A1 | 3/2011 |

(Continued)

OTHER PUBLICATIONS

Beens, J. et al., "Comprehensive two-dimensional gas chromatography—a powerful and versatile technique", Analyst, 130, pp. 123-127, 2005.

(Continued)

*Primary Examiner* — Tam M Nguyen
(74) *Attorney, Agent, or Firm* — BUCHANAN INGERSOLL & ROONEY PC

(57) ABSTRACT

A blend for producing a mixture of hydrocarbons by thermal cracking, the blend comprising a renewable paraffin composition and fossil naphtha.

20 Claims, 3 Drawing Sheets

(56) References Cited

U.S. PATENT DOCUMENTS

| | | | |
|---|---|---|---|
| 2009/0076216 A1 | 3/2009 | Kiss et al. | |
| 2010/0292517 A1 | 11/2010 | Debuisschert et al. | |
| 2011/0160505 A1* | 6/2011 | McCall | C10L 1/08 585/310 |
| 2017/0158970 A1 | 6/2017 | Song et al. | |
| 2018/0282632 A1 | 10/2018 | Hakola et al. | |
| 2019/0177652 A1 | 6/2019 | Atkins et al. | |
| 2019/0228843 A1 | 7/2019 | Hou et al. | |
| 2020/0318016 A1* | 10/2020 | Jamieson | C10L 1/04 |
| 2021/0189256 A1* | 6/2021 | Rämö | C10G 3/00 |

FOREIGN PATENT DOCUMENTS

| | | |
|---|---|---|
| SG | 11201506178P A | 9/2015 |
| WO | 2014142002 A1 | 9/2014 |
| WO | 2016058953 A1 | 4/2016 |
| WO | 2016184893 A1 | 11/2016 |
| WO | 2016184894 A1 | 11/2016 |

OTHER PUBLICATIONS

Finnish Search Report dated Jul. 5, 2018, issued by the Finnish Patent and Registration Office in the corresponding Finnish Patent Application No. 20185344. (2 pages).

International Search Report (PCT/ISA/210) dated May 22, 2019, by the European Patent Office as the International Searching Authority for International Application No. PCT/FI2019/050281.

Search Report and Written Opinion dated Aug. 27, 2021, by the Singaporean Patent Office in corresponding Singaporean Patent Application No. 11202009898W. (10 pages).

Van Geem, K. M. et al., "On-line analysis of complex hydrocarbon mixtures using comprehensive two-dimensional gas chromatography", Journal of Chromatography A, 1217, pp. 6623-6633, 2010.

Written Opinion (PCT/ISA/237) dated May 22, 2019, by the European Patent Office as the International Searching Authority for International Application No. PCT/FI2019/050281.

\* cited by examiner

METHOD FOR PRODUCING A MIXTURE OF HYDROCARBONS

CROSS-REFERENCE TO RELATED APPLICATIONS

This application is a divisional of U.S. patent application Ser. No. 17/045,883, filed on Oct. 7, 2020, Now U.S. Pat. No. 11,384,292, which is a U.S. national stage application of PCT/FI2019/050281, filed on Apr. 8, 2019, and which claims priority to Finnish Patent Application No. 20185344, filed on Apr. 10, 2018, the entire contents of all of which are hereby incorporated by reference.

TECHNICAL FIELD

The present invention generally relates to a method for producing hydrocarbons. The invention relates particularly, though not exclusively, to a method for producing hydrocarbons by thermally cracking a blend containing a fossil hydrocarbon composition and a hydrocarbon composition derived from renewable feedstock.

BACKGROUND ART

This section illustrates useful background information without admission of any technique described herein representative of the state of the art.

Steam cracking is an important method for producing raw materials for the petrochemical industry. Examples of such raw materials are monomers, such as ethene, propene, 1,3-butadiene, and BTX (benzene, toluene, xylenes). Said monomers may, for example, be used as raw material for major polymers such as polyethene (PE), polypropene (PP), and polyethylene terephthalate (PET).

The steam cracking process is based on thermal cracking of hydrocarbons in the presence of steam. Depending of the feed and the cracking conditions, such as coil outlet temperature and steam to hydrocarbon ratio, different product yields are expected. In Europe, typical steam cracker feeds are LPG (liquified or liquid petroleum gas) and fossil naphtha. High value chemicals (HVCs), such as ethene, propene and aromatics (benzene, toluene and xylenes), obtained from the steam cracking process are used to make various chemicals.

Replacing fossil raw materials with more sustainable renewable raw materials is of increasing interest because of environmental considerations. WO2016184893A1 and WO2016184894A1 disclose steam cracking hydrocarbon feeds derived from renewable sources. Steam cracking feeds comprising both hydrocarbons derived from renewable sources and fossil hydrocarbons are not mentioned.

SUMMARY

It is an object of the present invention to provide a more flexible method for producing a mixture of hydrocarbons by using a blend containing both a fossil hydrocarbon composition and a hydrocarbon composition derived from renewable feedstock. Another object of the present invention is to provide a more environmentally friendly method for producing a mixture of hydrocarbons, compared to conventional methods using neat fossil feedstock by replacing a portion of the fossil feedstock with feedstock derived from renewable sources. A further object of the present invention is to provide an alternative to existing technology.

According to a first aspect of the invention there is provided a method for producing a mixture of hydrocarbons, the method comprising the steps of: (a) providing a renewable paraffin composition containing at least 75 wt-% isoparaffins, (b) combining fossil naphtha with the renewable paraffin composition to form a blend; and (c) thermally cracking the blend to produce a mixture of hydrocarbons.

The present inventors have developed a process for producing a mixture of hydrocarbons by thermally cracking a blend containing a renewable paraffin composition and fossil naphtha. Surprisingly, it was found that providing a highly isomerized paraffin composition improves the blendability of the renewable paraffin composition and the fossil naphtha at temperatures above the pour point of the blend. Because of the differences in densities and chemical compositions the renewable paraffin composition tends to form two or multiple phase systems when combined with fossil naphtha, if not sufficient mixing or time is applied. Generally, feed tanks of thermal crackers are not equipped with mixers. Hence, blendability of the renewable paraffin composition and fossil naphtha is important. Thermally cracking an even blend yields a predictable, or steady, cracking product distribution. For the same reasons, the stability of the formed blend is also important for the operability of the plant.

In an embodiment, the renewable paraffin composition contains at least 80 wt-%, preferably at least 85 wt-%, more preferably at least 90 wt-% isoparaffins. In an embodiment, the renewable paraffin composition contains preferably at least 90 wt-% paraffins, more preferably at least 95 wt-% paraffins, and even more preferably at least 99 wt-% paraffins. Increasing the paraffin content of the renewable paraffin composition promotes formation of high value chemicals in the cracking step.

In an embodiment, the renewable paraffin composition comprises at least 25 wt-% multiple branched isoparaffins, preferably at least 30 wt-% multiple branched isoparaffins, more preferably at least 35 wt-% multiple branched isoparaffins, and even more preferably at least 40 wt-% multiple branched isoparaffins. Multiple branched isoparaffins promote the formation of C5+ products, such as pyrolysis gasoline, and aromatics, such as benzene, toluene, and xylenes in the thermal cracking step. Further, multiple branched isoparaffins promote the blendability of the renewable paraffin composition with fossil naphtha.

In an embodiment, fossil naphtha is combined with the renewable paraffin composition such that the blend contains at least 1 wt-%, preferably at least 5 wt-%, more preferably at least 10 wt-%, and even more preferably at least 20 wt-% fossil naphtha. A blend of fossil naphtha and the renewable paraffin composition has improved cold properties compared to an unblended (100 wt-%) renewable paraffin composition. Said improvement in cold properties is more pronounced when the blend comprises at least 20 wt-% fossil naphtha. In an embodiment, fossil naphtha is combined with the renewable paraffin composition such that the blend contains at most 99 wt-%, preferably at most 95 wt-%, more preferably at most 90 wt-%, and even more preferably at most 80 wt-% fossil naphtha. It was found that thermally cracking the blend of the renewable paraffin composition and fossil naphtha improves the yield of high value chemicals (HVCs), such as ethene, propene and aromatics (benzene, toluene and xylenes), compared to thermally cracking neat, or unmixed, fossil naphtha.

Further, thermally cracking said blend may reduce the coking rate compared to thermally cracking neat fossil naphtha. Said effects are more pronounced, when the blend comprises at most 80 wt-% fossil naphtha. In an embodiment, the sum of the wt-% amounts of the renewable paraffin composition and of the fossil naphtha in the blend formed in step b) is at least 90 wt-%, preferably at least 95 wt-%, more preferably at least 99 wt-% of the total weight of the blend. In a further embodiment, the remainder of the blend, i.e. the portion (wt-%) of the blend that is not fossil naphtha, is renewable paraffin composition (i.e. the remainder of the blend consists of the renewable paraffin composition).

In an embodiment, the renewable paraffin composition and the fossil naphtha form one liquid phase above the pour point of the blend (and at atmospheric pressure). It was found that the renewable paraffin composition and fossil naphtha can be combined such that the renewable paraffin composition and the fossil naphtha form one liquid phase at temperatures above the pour point of the blend (and at the atmospheric pressure). Thermally cracking an evenly distributed blend allows a predictable, or steady, cracking product distribution.

In an embodiment, the thermal cracking is steam cracking. In a preferred embodiment, thermally cracking the blend is performed with a cracker for thermally cracking liquid fossil feeds, such as fossil naphtha. The cracking step of the method according to the first aspect of the invention may be performed using conventional naphtha crackers without investing in infrastructure. In an embodiment, the steam cracking is performed at a flow rate ratio between water and the blend ($H_2O$ flow rate [kg/h]/HC flow rate [kg/h]) of 0.05 to 1.20, and/or at a COT selected from the range from 700 to 960° C. The process parameters of the thermal cracking step may be selected from wide ranges. In an embodiment, the steam cracking is performed at a flow rate ratio between water and the blend ($H_2O$ flow rate [kg/h]/HC flow rate [kg/h]) of 0.35 to 0.6, and/or at a COT selected from the range from 780 to 880° C. A particularly good yield of HVCs is obtained using a flow rate ratio between water and the blend or coil outlet temperature selected from the ranges hereabove. The yield of HVCs is further increased by using a flow rate ratio between water and the blend and a coil outlet temperature selected from the ranges hereabove.

In an embodiment, providing a renewable paraffin composition comprises (i) preparing a hydrocarbon raw material from a renewable feedstock, and (ii) subjecting at least straight chain hydrocarbons in the hydrocarbon raw material to an isomerization treatment to prepare the renewable paraffin composition, and wherein subjecting at least straight chain hydrocarbons in the hydrocarbon raw material to an isomerization treatment comprises controlling the isomerization degree of the renewable paraffin composition being prepared, and optionally controlling production of mono-branched isoparaffins and multiple branched isoparaffins during the isomerization treatment. A renewable paraffin composition provided as in the embodiment described here before particularly improves blendability with fossil naphtha and promotes the formation of HVCs in the thermal cracking step. In an embodiment, preparing a hydrocarbon raw material comprises subjecting the renewable feedstock to a deoxygenation treatment, wherein the deoxygenation treatment is preferably hydrotreatment, preferably hydrodeoxygenation; and/or hydrocracking hydrocarbons in the hydrocarbon raw material. A renewable paraffin composition provided as in the embodiment described here before particularly promotes the formation of HVCs in the thermal cracking step.

In an embodiment, the renewable paraffin composition comprises at least one of a heavy fraction having a boiling point ranging from 180 to 360° C. (as measured according to EN-ISO-3405 (2011)) and a light fraction having a boiling point ranging from 30 to 180° C. (as measured according to EN-ISO-3405 (2011)), and wherein the blend comprises the heavy fraction and/or the light fraction. Said heavy fraction and/or light fraction blend well with fossil naphtha and improves the yield of HVCs in the thermal cracking step. In an embodiment, the renewable paraffin composition is selected from one of fractions A and B, wherein; fraction A comprises more than 50 wt-%, preferably at least 75 wt-%, more preferably at least 90 wt-% C10-C20 hydrocarbons, the content of even-numbered hydrocarbons in the C10-C20 range being preferably more than 50 wt-%, and the fraction A containing at most 1.0 wt-%, preferably at most 0.5 wt-%, more preferably at most 0.2 wt-% aromatics, and less than 2.0, preferably at most 1.0 wt-%, more preferably at most 0.5 wt-% olefins, and less than 10 wt-%, preferably less than 5 wt-%, and more preferably less than 3 wt-% naphthenes; and fraction B comprises more than 50 wt-%, preferably at least 75 wt-%, more preferably at least 90 wt-% C5-C10 hydrocarbons, and the fraction B containing at most 1.0 wt-%, preferably at most 0.5 wt-%, more preferably at most 0.2 wt-% aromatics, and less than 2.0, preferably at most 1.0 wt-%, more preferably at most 0.5 wt-% olefins, and less than 10 wt-%, preferably less than 5 wt-%, and more preferably less than 3 wt-% naphthenes. In an embodiment, the renewable paraffin composition is fraction A. In another embodiment, the renewable paraffin composition is fraction B. A particularly good yield of HVCs is obtained thermally cracking the fractions mentioned hereabove.

According to a second aspect of the invention there is provided a blend for producing a mixture of hydrocarbons by thermal cracking, the blend containing a renewable paraffin composition and fossil naphtha, wherein the ratio of the wt-% amount isoparaffins of the renewable paraffin composition to the wt-% amount of n-paraffins of the renewable paraffin composition is at least 2.5, preferably at least 4.0, more preferably at least 5.5, even more preferably at least 9.0. Surprisingly, it has been found that blends of a renewable paraffin composition and fossil naphtha in which the renewable paraffin composition has a high ratio of the wt-% amount isoparaffins of the renewable paraffin composition to the wt-% amount of n-paraffins of the renewable paraffin composition form even, more stable blends with fossil naphtha compared to blends in which the renewable paraffin composition is less isomerized (i.e. the wt-% amount of isoparaffins is low). An even blend is particularly suitable for thermal cracking, since it provides an even, predictable, or steady, product distribution when thermally cracked. Further, said blends are more stable, i.e. less likely to form two or multiphase systems in the absence of sufficient mixing of the blend compared to blends in which the renewable paraffin composition contains a high (wt-%) amount of n-paraffins (or low amount (wt-%) of isoparaffins). The stability of the blend wherein the renewable paraffin composition has a high ratio of the wt-% amount isoparaffins of the renewable paraffin composition to the wt-% amount of n-paraffins of the renewable paraffin composition is particularly improved at low ambient temperatures compared to blends wherein the renewable paraffin composition contains a high (wt-%) amount of n-paraffins. The improvement in stability is beneficial for example when the blend of the second aspect is used as a thermal cracker feed providing for a more even product distribution.

In an embodiment, the ratio of the wt-% amount multiple branched isoparaffins of the renewable paraffin composition to the combined wt-% amounts of n-paraffins and mono-branched isoparaffins of the renewable paraffin composition is at least 0.30, preferably at least 0.40, more preferably at least 0.50, even more preferably at least 0.65. Multiple branched isoparaffins promote the formation of C5+ products, such as pyrolysis gasoline, and aromatics, such as benzene, toluene, and xylenes in the thermal cracking step. Further, multiple branched isoparaffins promote the stability of the blend by improving the blendability of the renewable paraffin composition with fossil naphtha.

In an embodiment, the blend comprises at least 1 wt-%, preferably at least 5 wt-%, more preferably at least 10 wt-%, and even more preferably at least 20 wt-% fossil naphtha. A blend of fossil naphtha and the renewable paraffin composition has improved cold properties compared to an unblended (100 wt-%) renewable paraffin composition. Said improvement in cold properties is more pronounced when the blend comprises at least 20 wt-% fossil naphtha. In an embodiment, the blend contains at most 99 wt-%, preferably at most 95 wt-%, more preferably at most 90 wt-%, and even more preferably at most 80 wt-% fossil naphtha. The blend of the embodiment hereabove is particularly well suited for thermal cracking, since it improves the yield of high value chemicals (HVCs), such as ethene, propene and aromatics (benzene, toluene and xylenes), compared to thermally cracking neat, or unmixed, fossil naphtha. Further, thermally cracking said blend may reduce the coking rate compared to thermally cracking neat fossil naphtha. Said effects are more pronounced, when the blend comprises at most 80 wt-% fossil naphtha. In an embodiment, the sum of the wt-% amounts of the renewable paraffin composition and of fossil naphtha in the blend is at least 90 wt-%, preferably at least 95 wt-%, more preferably at least 99 wt-%, of the total weight of the blend.

According to a third aspect of the invention there is provided a mixture of hydrocarbons obtainable by the method according to the first aspect of the invention. Said mixture of hydrocarbons is derived from a blend containing renewable paraffins and paraffins of fossil origin. Thus, said mixture of hydrocarbons is more sustainable than hydrocarbons derived from neat fossil naphtha.

According to a fourth aspect of the invention there is provided use of the mixture of hydrocarbons according to the third aspect for producing chemicals and/or polymers. Examples of such chemicals are ethylene oxide, propylene oxide, monoethylene oxide, monopropylene oxide, acrylic acid, vinyl chloride, terephthalic acid, styrene and polymers such as such as polyethylene, polypropylene, polystyrene, polyethylene terephthalate, acrylonitrile butadiene styrene, styrene butadiene rubber, polystyrene, and polyvinyl chloride. Using said mixture of hydrocarbons for producing chemicals and/or polymers provides producing more sustainable chemicals and/or polymers, since the mixture of hydrocarbons is derived from a blend containing renewable paraffins and paraffins of fossil origin (compared to hydrocarbons derived from paraffins of only fossil origin).

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

Some example embodiments of the invention will be described with reference to the accompanying drawings, in which.

DETAILED DESCRIPTION

Figure 1:
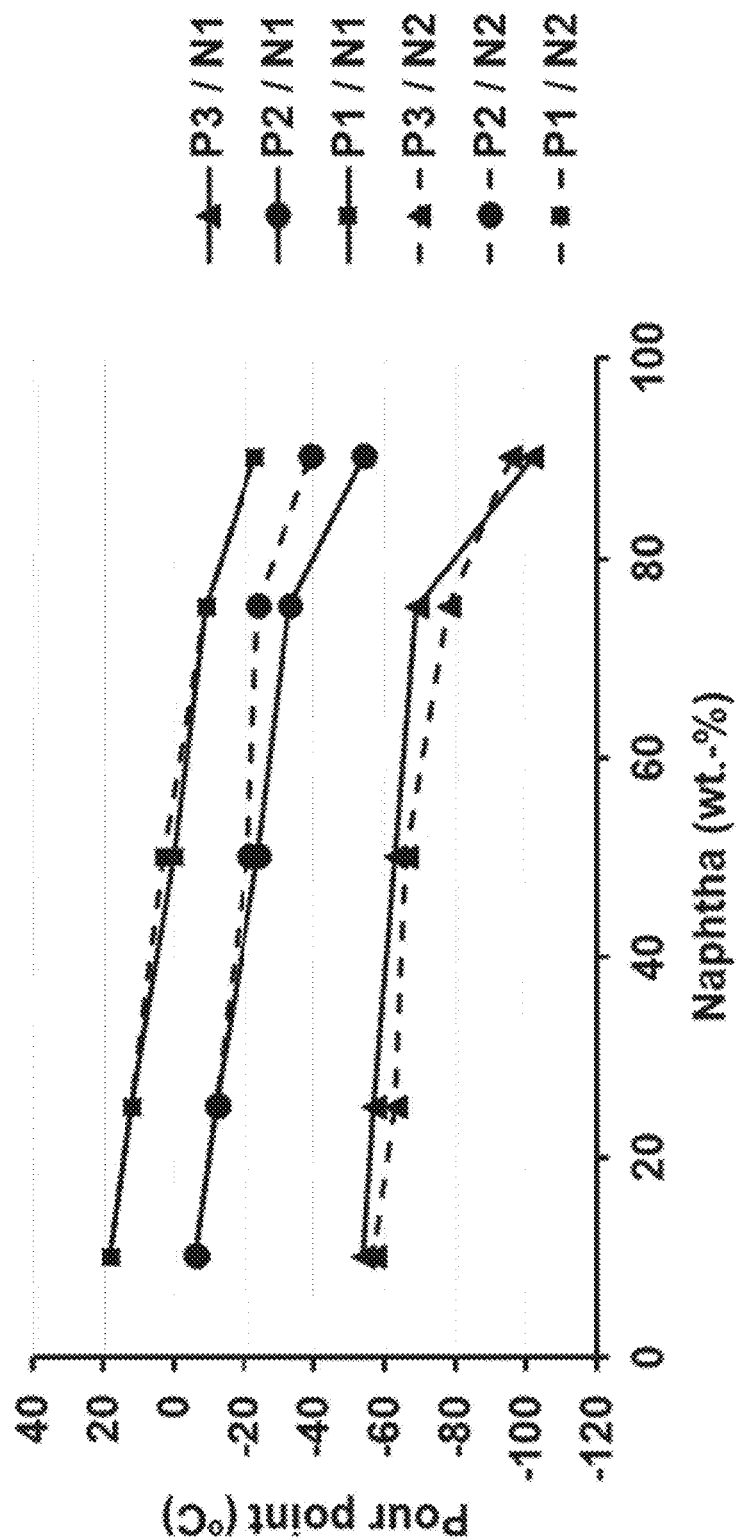
FIG. 1 shows a graph presenting the pour points (° C.) of blends of renewable paraffin composition and fossil naphtha described in the Examples as a function of the wt-% amount of fossil naphtha in the blends (the solid lines denote blends of naphtha N1, and the dotted lines denote blends of naphtha N2; the triangles denote blends of renewable paraffin compostion P3, the circles denote blends of renewable paraffin compostion P2, and the squares denote blends of renewable paraffin compostion P1)

In the following description, like reference signs denote like elements or steps.

As used herein, the term "comprising" includes the broader meanings of "including", "containing", and "comprehending", as well as the narrower expressions "consisting of" and "consisting only of".

As used herein "renewable paraffin composition" refers to a composition derived from a renewable feedstock or renewable source or sources, the composition mainly containing paraffins, and comprising isoparaffins.

As used herein, the term "heavy fraction" refers to a fraction, or composition, having a boiling point ranging from 180 to 360° C., obtained by the method EN-ISO-3405 (2011). As used herein, the term "light fraction" refers to a fraction, or composition, having a boiling point ranging from 30 to 180° C., obtained by the method EN-ISO-3405 (2011).

As used herein, "paraffin content" is the combined wt-% amounts of n-paraffins and isoparaffins. As used herein, the "isoparaffin content" is the combined wt-% amounts of monobranched isoparaffins and multiple branched isoparaffins.

The term "isomerization degree" is used herein to refer to the amount of isomerized paraffins relative to total paraffin content in a composition. Said amount may be expressed in wt-%.

The term "fossil" is used herein to denote components or compositions that are derived from nonrenewable sources. Herein, the term "fossil" may also relate to the wastes, fractions and streams from nonrenewable sources and their derivatives.

As used herein, "miscibility" refers to a compound's or composition's ability to form a uniform, or evenly distributed, blend with at least one other compound or composition. The use of "miscibility" herein is not intended to be limited to only complete miscibility, i.e. only referring to compounds or compositions that fully dissolve in each other at any proportions. Instead, miscibility is used herein in a broader meaning as a synonym for "blendability", i.e. describing how well compounds or compositions blend with or dissolve in each other.

Blend of Renewable Paraffin Composition and Fossil Naphtha

The present invention provides a blend containing a renewable paraffin composition and fossil naphtha. The blend may be used as a thermal cracker feed, i.e. it may be subjected to thermal cracking. The blend may be used to produce a mixture of hydrocarbons by thermally cracking it in a conventional thermal (steam) cracker for liquid fossil feed without modifying said conventional cracker, and with only few modifications to established cracking conditions.

Carbon atoms of renewable origin comprise a higher number of $^{14}C$ isotopes compared to carbon atoms of fossil origin. Therefore, it is possible to distinguish from the blend hydrocarbons (paraffins) of renewable origin and non-renewable hydrocarbons (paraffins) by analysing the ratio of $^{12}C$ and $^{14}C$ isotopes. Thus, a particular ratio of said isotopes can be used as a "tag" to identify renewable hydrocarbons and differentiate them from non-renewable hydrocarbons. The isotope ratio does not change in the course of chemical reactions.

The blend may be formed by (a) providing a renewable paraffin composition, and (b) combining fossil naphtha with the renewable paraffin composition to form a blend. Preferably, the sum of the wt-% amounts of the renewable paraffin composition and of fossil naphtha in the blend is at least 90 wt-%, more preferably at least 95 wt-%, and even more preferably at least 99 wt-%, of the total weight of the blend. In a further embodiment, the blend contains no other components than the renewable paraffin composition and fossil naphtha. The renewable paraffin composition of the blend contains isoparaffins (i-paraffins) and normal paraffins (n-paraffins). The renewable paraffin composition has preferably a high paraffin content, since a high paraffin content promotes a high yield of high value chemicals (HVCs), such as ethene, propene, butadiene and aromatics (benzene, toluene, xylenes). Thus, the renewable paraffin composition comprises preferably at least 90 wt-% paraffins. More preferably, the renewable paraffin composition comprises at least 95 wt-% paraffins. Most preferably, the renewable paraffin composition contains at least 99 wt-% paraffins.

The isoparaffins of the renewable paraffin composition comprises monobranched isoparaffins and/or multiple branched isoparaffins. Monobranched isoparaffins are paraffins, or alkanes, having one sidechain or branch. Multiple branched isoparaffins, or multibranched isoparaffins, are paraffins, or alkanes, having at least two sidechains or branches. Said multiple branched isoparaffins may have two, three, or more sidechains, or branches. In a preferred embodiment, the multiple branched isoparaffins have at least two sideschain. More preferably, the multiple branched isoparaffins have two, three, or more sidechains.

It has been found that increasing the amount of isoparaffins in the renewable paraffin composition promotes the blendability of the renewable paraffin composition with fossil naphtha. The higher the wt-% amount of isoparaffins, the more easily the renewable paraffin composition blends with fossil naphtha. A renewable paraffin composition having a high isomerization degree is less likely to form two or multiple phase systems with fossil naphtha in absence of sufficient mixing of the blend. Further, a renewable paraffin composition having a high isomerization degree form with fossil naphtha a blend having better cold properties, i.e. a lower temperature value of the pour point, compared to a blend wherein the renewable paraffin composition has a low isomerization degree. Said blend containing a highly isomerized renewable paraffin composition is more stable, i.e. less likely to form two or multiple phase systems, particularly at low ambient temperatures and have better processability, for example pumpability, compared to blends wherein the renewable paraffin composition has a low isomerization degree. Therefore, the renewable paraffin composition contains preferably more than 70 wt-% isoparaffins. In embodiments, wherein the blend contains no other components than the renewable paraffin composition and fossil naphtha, the degree of isomerization of the renewable paraffin composition is higher than 70 wt-% to ensure the operability of the blend at all blending ratios at low ambient temperatures, such as −20° C. Further preferably, the renewable paraffin composition contains at least 75 wt-% isoparaffins. More preferably, the renewable paraffin composition contains at least 80 wt-% isoparaffins. Even more preferably the renewable paraffin composition contains at least 85 wt-% isoparaffins. Most preferably, the renewable paraffin composition contains at least 90 wt-% isoparaffins. In an embodiment, the renewable paraffin composition contains at least 93 wt-% isoparaffins. In an embodiment, the isoparaffin content of the renewable paraffin composition is in the range from 73 wt-% to 95 wt-%, preferably from 76 wt-% to 95 wt-%, further preferably from 78 wt-% to 87 wt-%, and more preferably from 83 wt-% to 91 wt-%. The remainder of the paraffins in the renewable paraffin composition are n-paraffins.

In an embodiment, the ratio of the wt-% amount isoparaffins of the renewable paraffin composition to the wt-% amount of n-paraffins of the renewable paraffin composition is at least 2.5, preferably at least 3.0, more preferably at least 4.0, even more preferably at least 5.5, and most preferably at least 9.00. The benefits of a high ratio of the wt-% amount isoparaffins to the wt-% amount of n-paraffins, i.e. of the paraffins in the renewable paraffin composition being predominantly isoparaffins, are explained above.

In an embodiment, the renewable paraffin composition comprises at least 85 wt-% isoparaffins, the total amount of paraffins in the renewable paraffin composition being at least 95 wt-%. In a preferred embodiment, the renewable paraffin composition comprises at least 90 wt-% isoparaffins, the total amount of paraffins in the renewable paraffin composition being at least 99 wt-%. A renewable paraffin composition having a high isomerization degree and a high total content of paraffins have a good miscibility with fossil naphtha, good cold properties, and promotes the formation of HVCs in the thermal cracking step.

In an embodiment, the renewable paraffin composition comprises more than 20 wt-% multiple branched isoparaffins. Preferably, the content of multiple branched isoparaffins in the renewable paraffin composition is at least 25 wt-%. Further preferably, the content of multiple branched isoparaffins in the renewable paraffin composition is at least 30 wt-%. More preferably, the content of multiple branched isoparaffins in the renewable paraffin composition is at least 35 wt-%. Even more preferably, the content of multiple branched isoparaffins in the renewable paraffin composition is at least 40 wt-%. Further preferably, the content of multiple branched isoparaffins in the renewable paraffin composition is no more than 65 wt-%. More preferably, the content of multiple branched isoparaffins in the renewable paraffin composition is no more than 60 wt-%. Even more preferably, the content of multiple branched isoparaffins in the renewable paraffin composition is no more than 55 wt-%. The remainder of the isoparaffins of the renewable paraffin composition are monobranched isoparaffins. The amount of multiple branched isoparaffins in the renewable paraffin composition influences the product distribution of the mixture of hydrocarbons formed in the thermal cracking step. Multiple branched isoparaffins promote the formation of heavier (C5+) products, such as pyrolysis gasoline, aromatics benzene, toluene, and xylenes and reduce the ethene yield. Multiple branched isoparaffins crack also at lower temperatures compared to more linear paraffins. Additionally, multiple branched paraffins improve the blendability of the renewable paraffin composition with fossil naphtha.

In an embodiment, the ratio of the wt-% amount multiple branched isoparaffins of the renewable paraffin composition to the combined wt-% amounts of n-paraffins and mono-branched isoparaffins of the renewable paraffin composition is at least 0.25, preferably at least 0.30, further preferably at least 0.40, more preferably at least 0.45, even more preferably at least 0.50, and most preferably at least 0.65. Further, in an embodiment, the ratio of the wt-% amount multiple branched isoparaffins of the renewable paraffin composition to the combined wt-% amount of n-paraffins and mono-branched isoparaffins of the renewable paraffin composition is no more than 1.25, preferably no more than 1.20, more preferably no more than 1.00, and even more preferably no more than 0.80. The benefits of a renewable paraffin composition containing sufficiently multiple branched isoparaffins are explained above In a preferred embodiment, the renewable paraffin composition comprises at least 25 wt-% multiple branched isoparaffins, the total amount of isoparaffins in the renewable paraffin composition being at least 75 wt-%. In a preferred embodiment, the renewable paraffin composition comprises at least 25 wt-% multiple branched isoparaffins, the total amount of isoparaffins in the renewable paraffin composition being at least 85 wt-%. In a further preferred embodiment, the renewable paraffin composition comprises at least 30 wt-% multiple branched isoparaffins, the total amount of isoparaffins in the renewable paraffin composition being at least 90 wt-%. In a more preferred embodiment, the renewable paraffin composition comprises at least 40 wt-% multiple branched isoparaffins, the total amount of isoparaffins in the renewable paraffin composition being at least 90 wt-%. A renewable paraffin composition containing sufficiently multiple branched isoparaffins and having a high isomerization degree, i.e. high total (wt-%) amount of isoparaffins, have a good miscibility with fossil naphtha, good cold properties, and promotes the formation of HVCs, particularly propylene, benzene, toluene, and xylenes, in the thermal cracking step.

In an embodiment, the renewable paraffin composition contains more than 20 wt-% multiple branched isoparaffins, the total amount of isoparaffins in the renewable paraffin composition being more than 70 wt-% and the total amount of paraffins in the renewable paraffin composition being at least 90 wt-%. In a preferred embodiment, the renewable paraffin composition contains at least 25 wt-% multiple branched isoparaffins, the total amount of isoparaffins in the renewable paraffin composition being at least 75 wt-% and the total amount of paraffins in the renewable paraffin composition being at least 95 wt-%. In a further preferred embodiment, the renewable paraffin composition contains at least 35 wt-% multiple branched isoparaffins, the total amount of isoparaffins in the renewable paraffin composition being at least 90 wt-% and the total amount of paraffins in the renewable paraffin composition being at least 99 wt-%. A renewable paraffin composition containing sufficiently multiple branched isoparaffins, a high total amount (wt-%) of isoparaffins, and a high total amount (wt-%) of paraffins have a good miscibility with fossil naphtha, good cold properties, and gives a particularly good yield of HVCs, such as propylene benzene, toluene, and xylenes, in the thermal cracking step.

In general, any renewable paraffin composition as defined above can be used in the present invention. Nevertheless, two specific paraffin fractions (A and B) are to be mentioned, since they provide particularly desirable product distribution. Fractions A and B are also favourable in view of health, environment, and safety (HSE). What is defined above for the renewable paraffin composition applies also for fractions A and B. Fraction A comprises more than 50 wt-%, preferably 75 wt-% or more, more preferably 90 wt-% or more of C10-C20 hydrocarbons (based on the organic components). The content of even-numbered hydrocarbons in the C10-C20 range (i.e. C10, C12, C14, C16, C18, and C20) is preferably more than 50 wt-%. The fraction A contains no more than 1.0 wt-%, preferably 0.5 wt-% or less, more preferably 0.2 wt-% or less aromatics, and less than 2.0, preferably 1.0 wt-% or less, more preferably 0.5 wt-% or less of olefins, and no more than 5.0 wt-%, preferably 2.0 wt-% or less naphthenes. Fraction B comprises more than 50 wt-%, preferably 75 wt-% or more, more preferably 90 wt-% or more of C5-C10 hydrocarbons (based on the organic components). The fraction B contains no more than 1.0 wt-%, preferably 0.5 wt-% or less, more preferably 0.2 wt-% or less aromatics, and less than 2.0 wt-%, preferably 1.0 wt-% or less, more preferably 0.5 wt-% or less of olefins, and no more than 5.0 wt-%, preferably 2.0 wt-% or less naphthenes. A low amount of aromatics, olefins, and naphthenes in the renewable paraffin composition improves the product distribution of the cracking process. In other words, the smaller the amount (wt-%) of aromatics, olefins, and naphthenes in the renewable paraffin composition, the better the product distribution of the cracking process. "Better product distribution" refers in this context to a product distribution containing more high value products.

In an embodiment, the renewable paraffin composition comprises at least one of a heavy fraction having a boiling point ranging from 180 to 360° C. (as measured according to EN-ISO-3405 (2011)) and a light fraction having a boiling point ranging from 30 to 180° C. (as measured according to EN-ISO-3405 (2011)). Said fractions influences the product distribution of the mixture of hydrocarbons formed in the cracking step and promotes the formations of HVCs. In an embodiment, the renewable paraffin composition comprises the heavy fraction without comprising the light fraction. In an alternative embodiment, the renewable paraffin composition comprises the light fraction without comprising the heavy fractions.

In the present invention, the total (wt-%) amount of paraffins in the renewable paraffin composition is determined relative to all organic material in the renewable paraffin composition. The (wt-%) amounts of monobranched isoparaffins, multiple branched paraffins and n-paraffins are determined relative to the total paraffin content in the renewable paraffin composition. The (wt-%) amounts of monobranched isoparaffins, multiple branched isoparaffins, and n-paraffins may be determined using GC analysis combined with suitable detectors such as FID/MS, as explained in the Examples, or by any other suitable method. In any case, the renewable paraffin composition preferably contains at most 1 wt-% oxygen based on all elements constituting the renewable paraffin composition, as determined by elemental analysis. A low oxygen content of the renewable paraffin composition allows carrying out the cracking in a more controlled manner, thus resulting in a more favourable product distribution and better operability of the plant.

The fossil naphtha of the blend is conventional fossil naphtha. The fossil naphtha may be selected from various grades of fossil naphtha, such as heavy naphtha and light naphtha, or combinations thereof. Preferably, the boiling point range (initial boiling point to end point) of the fossil naphtha is within the temperature range from 30° C. to 360° C. The fossil naphtha may be petroleum naphtha obtained from the crude oil refining process. In an embodiment, the boiling point range of the fossil naphtha is within the range from 30° C. to 220° C. In a further embodiment, the boiling point range of the fossil naphtha is within the range from 30° C. to 90° C., preferably from 35° C. to 85° C. In another embodiment, the boiling point range of the fossil naphtha is within the range from 50° C. to 200° C., preferably from 50° C. to 187° C. In yet another embodiment, the boiling point range of the fossil naphtha is within the range from 180° C. to 360° C. The boiling point ranges are given as measured according to EN-ISO-3405 (2011). In an embodiment, the fossil naphtha comprises 20-85 wt-% paraffins, 0-35 wt-% olefins (alkenes), 5-30 wt-% naphthenes (cycloalkanes), and 0-30 wt-% aromatics (aromatic hydrocarbons). Said wt-% amounts are based on the total weight of the fossil naphtha. Preferably, the total wt-% amount of hydrocarbons in the fossil naphtha is at least 95 wt-%, preferably at least 99 wt-%.

The renewable paraffin composition as described above may be provided in step (a) of the method according to the first aspect of the invention. Further, the renewable paraffin composition as described above may be contained in the blend according to the second aspect of the invention. Using the blend containing the renewable paraffin composition and fossil naphtha as a thermal cracking feed enables flexible production of chemical building blocks and polymers from a feedstock with renewable hydrocarbon content. The properties, such as cold properties, of the blend and the product distribution of the mixture of hydrocarbons from the thermal cracking may be controlled by altering the (wt-%) amounts of the renewable paraffin composition and fossil naphtha in the blend. Yet further, the blend and method provided by the present invention improve the (environmental) sustainability of the thermal cracking process and the cracking products compared to thermal cracking processes using neat naphtha as feedstock.

In an embodiment, the blend contains at least 1 wt-%, preferably at least 5 wt-%, further preferably at least 10 wt-%, more preferably at least 15 wt-%, even more preferably at least 20 wt-%, and most preferably at least 30 wt-% fossil naphtha. In a further embodiment, the blend contains at least 3 wt-%, preferably at least 6 wt-%, further preferably at least 8 wt-%, more preferably at least 12 wt-%, even more preferably at least 17 wt-% fossil naphtha. In yet a further embodiment, the blend contains at least 23 wt-%, preferably at least 25 wt-%, more preferably at least 27 wt-% fossil naphtha. In an embodiment, the blend contains at most 99 wt-%, preferably at most 95 wt-%, further preferably at most 90 wt-%, more preferably at most 85 wt-%, even more preferably at most 80 wt-%, and most preferably at most 75 wt-% of fossil naphtha. In an embodiment, the blend contains at most 97 wt-%, preferably at most 93 wt-%, further preferably at most 87 wt-%, more preferably at most 83 wt-%, and even more preferably at most 77 wt-% fossil naphtha. Preferably, the sum of the wt-% amounts of the renewable paraffin composition and of fossil naphtha in the blend is at least 90 wt-%, more preferably at least 95 wt-%, and even more preferably at least 99 wt-%, of the total weight of the blend.

The blend containing from 1 wt-% to 99 wt-% fossil naphtha can be thermally cracked resulting in a good yield of HVCs. The product distribution may be controlled by varying the (wt-%) amount of fossil naphtha in the blend. Fossil naphtha decreases the pour point of the blend compared to the pour point of the neat renewable paraffin composition. The decrease of the pour point is seen particularly for blends containing at least 10 wt-% of fossil naphtha.

The improvement in cold properties also improves the stability and processability of the blend at low ambient temperatures. Further, it has been found that the renewable paraffin composition improves the yield of HVCs produced from the blend by thermal cracking compared to the yield of HVCs of neat fossil naphtha. This effect is particularly seen for blends containing at least 15 wt-% of the renewable paraffin composition. Yet further, using the blend comprising renewable paraffin composition as a thermal cracking feed may reduce the coking rate compared to thermally cracking neat fossil naphtha.

In an preferred embodiment, the blend contains from 25 wt-% to 70 wt-%, preferably 30 wt-% to 70 wt-%, more preferable from 35 wt-% to 65 wt-%, even more preferably from 40 wt-% to 55 wt-%, and most preferably from 45 to 50 wt-% fossil naphtha. Blends containing moderately fossil naphtha balances the benefits of the renewable paraffin composition and of the fossil naphtha. That is, blends containing moderately fossil naphtha have very good cold properties, and give an improved yield of HVCs and may reduce the coking rate compared to neat fossil naphtha.

In a preferred embodiment, the blend contains from 30 wt-% to 70 wt-% fossil naphtha and a renewable paraffin composition containing at least 75 wt-% isoparaffins. In a further preferred embodiment, the blend contains from 30 wt-% to 70 wt-% fossil naphtha and a renewable paraffin composition containing at least 90 wt-% isoparaffins. In a particularly preferred embodiment, the blend comprises 25-70 wt-%, preferably 25-65 wt-%, fossil naphtha comprising 20-85 wt-% paraffins, 0-35 wt-% olefins, 5-30 wt-% naphthenes, and 0-30 wt-% aromatics, and a renewable paraffin composition containing at least 25 wt-% multiple branched isoparaffins, the total amount of isoparaffins in the renewable paraffin composition being at least 75 wt-%, the sum of the wt-% amounts of the renewable paraffin composition and of the fossil naphtha in the blend being at least 95 wt-% of the total weight of the blend. The components of such blends have good miscibility in each other (i.e. good blendability with each other forming an evenly distributed blend), excellent cold properties, and promotes the formation of HVCs.

Because of the differences in densities and chemical compositions the renewable paraffin compositions and fossil naphtha tend to form two or multiple phase systems if not sufficient mixing or time is applied. Typical cracker feed tanks are not equipped with efficient mixing equipment. Therefore, blendability of the components is of high importance. In an embodiment, the difference between the density of the renewable paraffin composition containing more than 70 wt-%, preferably at least 75 wt-%, further preferably at least 80 wt-%, more preferably at least 85 wt-%, and even more preferably at least 90 wt-%, isoparaffins and the fossil naphtha is at least 20 kg/m$^3$, preferably at least 50 kg/m$^3$, further preferably at least 70 kg/m$^3$, and more preferably at least 100 kg/m$^3$ as measured at 15° C. according to EN-ISO-12185 (1996). Surprisingly, it was found that despite the difference in densities the components of the blend had good miscibility with each other.

In an embodiment, the renewable paraffin composition and the fossil naphtha form one liquid phase above the pour point of the blend. It was found that the renewable paraffin composition and fossil naphtha can be combined such that the renewable paraffin composition and the fossil naphtha form one liquid phase at temperatures above the pour point of the blend (at atmospheric pressure). Thermally cracking an evenly distributed blend allows a predictable, or steady, cracking product distribution. The properties, such as cold properties and processing properties, of an evenly distributed blend are more predictable than the properties of multiphase systems. Further, the formation of layers or regions having different pour points is avoided. "One liquid phase" is used herein to denote blends containing liquids, which upon visual inspection (by naked human eye) comprise a single liquid phase, i.e. no more than one liquid phase. In other words, no liquid phase separation or distinguishable liquid regions deviating from the (liquid) remainder of the blend are observed.

In an embodiment, the renewable paraffin composition and the fossil naphtha are combined in a thermal cracking feed tank without mixers. In an embodiment, the combining fossil naphtha with the renewable paraffin composition to form a blend is performed without additional mixing. In other words, in an embodiment combining fossil naphtha with the renewable paraffin composition to form a blend is performed without mixers or a mixing equipment. "Additional mixing" as used herein refers to mixing performed in addition to the inherent mixing of the combining. Such inherent mixing may be mixing caused by pouring one component of the blend into a receptacle comprising another component of the blend, or inlet of the components of the blend into a receptacle at flow rates above zero.

Renewable Feedstock

In the present invention, the renewable feedstock may be obtained or derived from any renewable source, such as plants or animals, including fungi, yeast, algae and bacteria. Said plants and microbial sources may be genemanipulated. Preferably, the renewable feedstock comprises, or is obtained or derived from, oil (in particular fatty oil), such as plant or vegetable oil, including wood based oil, animal oil, fish oil, algae oil, and/or microbial oil, or fat, such as plant or vegetable fat, animal fat, and/or fish fat, recycled fats of food industry, and/or combinations thereof. The renewable feedstock may comprise, or be obtained from, or derived from, any other feedstock that can be subjected to biomass gasification or biomass to liquid (BTL) methods.

The renewable feedstock may be subjected to an optional pre-treatment before preparation of a hydrocarbon raw material or of the renewable paraffin composition. Such pre-treatment may comprise purification and/or chemical modification, such as saponification or transesterification. If the renewable raw material, i.e. the raw material of the renewable feedstock, is a solid material (at ambient conditions), it is useful to chemically modify the material so as to derive a liquid renewable feedstock. In a preferred embodiment, the renewable feedstock is a liquid renewable feedstock (at ambient conditions).

Preferably, the renewable feedstock comprises at least one of vegetable oil, vegetable fat, animal oil, and animal fat. These materials are preferred, since they allow providing a renewable feedstock having a predictable composition which can be adjusted as needed by appropriate selection and/or blending of the natural oil(s) and/or fat(s).

Hydrocarbon Raw Material and Preparation Thereof

The renewable paraffin composition of the present invention may be provided by isomerizing a hydrocarbon raw material obtained or derived from the renewable feedstock.

Generally, the hydrocarbon raw material may be produced from the renewable feedstock using any known method. Specific examples of a method for producing the hydrocarbon raw material are provided in the European patent application EP 1741768 A1. Also other methods may be employed, particularly another BTL method may be chosen, for example biomass gasification followed by a Fischer-Tropsch method.

In a preferred embodiment, preparing a hydrocarbon raw material from a renewable feedstock comprises subjecting the renewable feedstock to a deoxygenation treatment. Most renewable feedstock comprises materials having a high oxygen content. In an embodiment, the renewable feedstock comprises fatty acids, or fatty acid derivatives, such as triglycerides, or a combination thereof. In the present invention, the deoxygenating method is not particularly limited and any suitable method may be employed. Suitable methods are, for example, hydrotreating, such as hydrodeoxygenation (HDO), catalytic hydrodeoxygenation (catalytic HDO), catalytic cracking (CC), or a combination thereof. Other suitable methods include decarboxylation and decarbonylation reactions, either alone or in combination with hydrotreating.

In a preferred embodiment, the deoxygenation treatment, to which the renewable feedstock is subjected, is hydrotreatment. Preferably, the renewable feedstock is subjected to hydrodeoxygenation (HDO) which preferably uses a HDO catalyst. (Catalytic) HDO is the most common way of removing oxygen and has been extensively studied and optimized. However, the present invention is not limited thereto. As the HDO catalyst, a HDO catalyst comprising hydrogenation metal supported on a carrier may be used. Examples include a HDO catalyst comprising a hydrogenation metal selected from a group consisting of Pd, Pt, Ni, Co, Mo, Ru, Rh, W or a combination of these. Alumina or silica is suited as a carrier, among others. The hydrodeoxygenation step may, for example, be conducted at a temperature of 100-500° C. and at a pressure of 10-150 bar (absolute).

Preparing a hydrocarbon raw material from the renewable feedstock may comprise a step of hydrocracking hydrocarbons in the hydrocarbon raw material. Thus, the chain length of the hydrocarbon raw material may be adjusted and the product distribution of the produced mixture of hydrocarbons can be indirectly controlled.

Isomerization Treatment

The renewable paraffin composition of the present invention may be provided by subjecting at least straight chain hydrocarbons in the hydrocarbon raw material to an isomerization treatment to prepare the renewable paraffin composition. The hydrocarbon raw material and its preparation is described above.

In an embodiment, providing the renewable paraffin composition comprises subjecting at least a part of the straight chain alkanes, or paraffins, in the hydrocarbon raw material to an isomerization treatment to prepare the renewable paraffin composition. The straight chain alkane, or a portion thereof, may be separated from the remainder of the hydrocarbon raw material, the separated straight chain alkanes then subjected to isomerization treatment and then optionally re-unified with the remainder of the hydrocarbon raw material. Alternatively, all of the hydrocarbon raw material may be subjected to isomerization treatment.

The isomerization treatment is not particularly limited. Preferably, the isomerization treatment is a catalytic isomerization treatment. It is preferred that only a part of the hydrocarbon raw material is subjected to an isomerization step. In a preferred embodiment, the part of the hydrocarbon raw material corresponding to a heavy fraction boiling at or above a temperature of 300° C. measured e.g. by the method EN-ISO-3405 (2011) is subjected to an isomerization step, preferably combined with a catalytic cracking step. The high boiling point part of the hydrocarbon raw material, after optional catalytic cracking, results mainly in a heavy fraction after isomerization. Thermally cracking the heavy fraction leads to improved product distribution.

The isomerization step may be carried out in the presence of an isomerization catalyst, and optionally in the presence of hydrogen added to the isomerisation process. Suitable isomerisation catalysts contain a molecular sieve and/or a metal selected from Group VIII of the periodic table and optionally a carrier. Preferably, the isomerization catalyst contains SAPO-11, or SAPO-41, or ZSM-22, or ZSM-23, or ferrierite, and Pt, Pd, or Ni, and $Al_2O_3$, or $SiO_2$. Typical isomerization catalysts are, for example, Pt/SAPO-11/$Al_2O_3$, Pt/ZSM-22/$Al_2O_3$, Pt/ZSM-23/$Al_2O_3$, and Pt/SAPO-11/$SiO_2$. The catalysts may be used alone or in combination. The presence of added hydrogen is particularly preferable to reduce catalyst deactivation. In a preferred embodiment, the isomerization catalyst is a noble metal bifunctional catalyst, such as Pt-SAPO and/or Pt-ZSM-catalyst, which is used in combination with hydrogen. The isomerization step may, for example, be conducted at a temperature of 200-500° C., preferably 280-400° C., and at a pressure of 20-150 bar, preferably 30-100 bar (absolute). The isomerization step may comprise further intermediate steps such as a purification step and a fractionation step.

The isomerization treatment causes branching of hydrocarbon chains (i.e. isomerization) of the hydrocarbon raw material. Branching of hydrocarbon chains improves cold properties, i.e. the renewable paraffin composition formed by the isomerization treatment has better cold properties compared to the hydrocarbon raw material. Better cold properties refers to a lower temperature value of the pour point. Further, it has been found that branching of hydrocarbon chains improves the blendability of the renewable paraffin composition with fossil naphtha. The isomeric hydrocarbons, or isoparaffins, formed by the isomerization treatment may have one or more side chains, or branches. In a preferred embodiment, the formed isoparaffins have one or more C1-C9, preferably C1-C2, branches. Usually, isomerization of the hydrocarbon raw material produces predominantly methyl branches. The severity of isomerization conditions and choice of catalyst controls the amount of methyl branches formed and their distance from each other and thus influences the product distribution obtained after thermal cracking.

The isomerization treatment is a step which predominantly serves to isomerize the hydrocarbon raw material. That is, while most thermal or catalytic conversions (such as HDO) result in a minor degree of isomerization (usually less than 5 wt-%), the isomerization step which may be employed in the present invention is a step which leads to a significant increase in the content of isoparaffins in the renewable paraffin composition. The isomerization treatment is also the step predominantly controlling the amounts of monobranched and multiple branched isoparaffins in the prepared renewable paraffin composition.

In an embodiment, subjecting at least straight chain hydrocarbons in the hydrocarbon raw material to an isomerization treatment comprises controlling the formation of multiple branched isoparaffins during the isomerization treatment. Preferably, the content of multiple branched isoparaffins of the intermediate product after isomerization is more than 20 wt-%, preferably at least 25 wt-%, further preferably at least 30 wt-%, more preferably at least 35 wt-%, and even more preferably at least 40 wt-% multiple branched isoparaffins. Further preferably, the content of multiple branched isoparaffins of the intermediate product after isomerization is no more than 65 wt-%, preferably no more than 60 wt-%, more preferably no more than 55 wt-% multiple branched isoparaffins. The amount of multiple branched isoparaffins formed in the isomerization step contributes to controlling the product distribution of the mixture of hydrocarbons formed in the thermal cracking step.

It is preferred that the isoparaffin content (wt-%) is increased by the isomerization treatment by at least 30 percentage points, more preferably at least 50 percentage points, even more preferably at least 60 percentage points, and most preferably at least 70 percentage points. More specifically, assuming that the isoparaffin content of the hydrocarbon raw material (organic material in the liquid component) is 1 wt-%, then the isoparaffin content of the intermediate product after isomerization is most preferably at least 71 wt-% (an increase of 70 percentage points). In an embodiment, the isoparaffin content of the intermediate product after isomerization is at least 75 wt-%, preferably at least 80 wt-%, more preferably at least 85 wt-%, and even more preferably at least 90.

A renewable paraffin composition obtained by an isomerization treatment as described above can be fed directly to the thermal cracking procedure. In other words, no purification is necessary after the isomerization step, so that the efficiency of the process can be further improved.

The earlier described hydrotreatment step and the isomerization step may be conducted in the same reactor. Alternatively, the hydrotreatment step and the isomerization step may be conducted in separate reactors. Water and light gases, such as carbon monoxide, carbon dioxide, and hydrogen, methane, ethane, propane and butane may be separated from the hydrotreated or hydrocracked composition and/or from the renewable paraffin composition with any conventional means, such as distillation, before thermal cracking. After or along with removal of water and light gases, the composition may be fractionated to one or more fractions, each of which may be provided as the renewable paraffin composition in the thermal cracking step. The fractionation may be conducted by any conventional means, such as distillation. Further, the renewable paraffin composition may optionally be purified. The purification and/or fractionation allows better control of the properties of the renewable paraffin composition, and thus the properties of the hydrocarbon mixture produced in the thermal cracking step.

In an preferred embodiment, a renewable feedstock comprising at least one of vegetable oil, vegetable fat, animal oil, and animal fat is subjected to hydrotreatment and isomerization, the isomerization comprising controlling the isomerization degree of the renewable paraffin composition being prepared. Optionally, the isomerization comprises controlling production of monobranched and multiple branched isoparaffins during the isomerization treatment. Preferably, the renewable paraffin composition comprising at least one of a heavy fraction (boiling point: 180-360° C. as measured according to EN-ISO-3405 (2011)) and a light fraction (boiling point: 30-180° C. as measured according to EN-ISO-3405 (2011)). In an embodiment, the renewable paraffin composition comprises the heavy fraction. In another embodiment, the renewable paraffin composition comprises the light fraction. The renewable paraffin composition comprising the heavy fraction and/or the light fraction is then subjected to thermal cracking, preferably steam cracking. In an embodiment only the heavy fraction is subjected to thermal cracking, wherein an alternative embodiment comprises subjecting only the light fraction to thermal cracking. In yet an embodiment, a mixture of the heavy fraction and the light fraction is subjected to thermal cracking. Most preferably, the heavy fraction is subjected to thermal cracking. Using these fractions and in particular such fractions derived from renewable oil and/or fat allows good control of the composition of the renewable paraffin composition, and thus of the mixture of hydrocarbons produced by the method of the first aspect of the invention.

Thermal Cracking of the Blend

The cracking step of the method according to the first aspect of the invention may be performed using conventional naphtha crackers. Thus, investment in infrastructure, such as new crackers or cracker facilities, can be avoided. Preferably, the thermal cracking of step (c) of the method according to the first aspect of the invention is steam cracking. Steam cracking facilities are widely used in petrochemical industry and the processing conditions are well known, thus requiring only few modifications of established processes. A conventional naphtha (steam) cracker, i.e. a cracker commonly used to thermally crack liquid fossil feeds, is preferably used to conduct the thermal cracking step. Thermal cracking is preferably carried out without catalyst. However, additives, such as dimethyl disulphide (DMDS), may be used in the cracking step to reduce coke formation.

A good yield of high value chemicals can be obtained performing the thermal cracking step at a coil outlet temperature (COT) selected from a wide temperature range. The COT is usually the highest temperature in the cracker. In the present invention, thermally cracking the blend is preferably conducted at a COT selected from the range from 700° C. to 960° C. Further preferably, the thermal cracking is conducted at a COT selected from the range from 760° C. to 890° C. More preferably, the COT in selected from the range from 780° C. to 860° C. Even more preferably, the COT in selected from the range from 800° C. to 860° C. A particularly good yield of HVCs is obtained selecting the COT from the ranges hereabove. The yield of HVCs may be further improved by selecting the COT from the range from 800° C. to 860° C., preferably from 820° C. to 840° C.

The COT influences the product distribution of the mixture of hydrocarbons, i.e. COT is a parameter controlling the yield of the thermal cracking. It has been found that a COT selected from the lower end of the temperature range promotes the formation of propene, which is a valuable thermal cracking product. In an embodiment, the COT is selected from the range from 700° C. to 840° C., preferably from 760 to 830° C., more preferably from 800° C. to 820° C. In yet an embodiment, the COT is selected from the range from 700° C. to 790° C., preferably from 700 to 780° C., more preferably from 725° C. to 775° C. It has also been found that a COT selected from the higher end of the temperature range promotes the formation of ethene and aromatics, such as benzene, toluene, and xylenes, which are valuable thermal cracking products. In an embodiment, the COT is selected from the range from 850° C. to 900° C., preferably from 855 to 890° C., more preferably from 860° C. to 880° C. In yet an embodiment, the COT is selected from the range from 910° C. to 960° C., preferably from 920 to 960° C., more preferably from 925° C. to 950° C.

The thermal cracking preferably comprises steam cracking. Steam cracking is preferably performed at a flow rate ratio between water and the blend ($H_2O$ flow rate [kg/h]/HC flow rate [kg/h]) of 0.05 to 1.20. In a preferred embodiment, the flow rate ratio between water and the blend is selected from 0.10 to 1.00. In yet a preferred embodiment, the flow rate ratio between water and the blend is selected from 0.20 to 0.80. More preferably, the flow rate ratio between water and the blend is selected from 0.25 to 0.70. Yet more preferably, the flow rate ratio between water and the blend is selected from 0.25 to 0.60. Even more preferably, the flow rate ratio between water and the blend is selected from 0.40 to 0.60. The flow rate ratio between water and the blend influences the product distribution of the mixture of hydrocarbons, i.e. said ratio is an parameter controlling the yield of the thermal cracking. Increasing the steam to hydrocarbon ratio promotes the yield of unsaturated hydrocarbons. Bimolecular reactions can be promoted by selecting a low flow rate ratio between water and the blend. Heavier feedstock, i.e. feedstock comprising long carbon chains, is favoured by an increase in the steam to hydrocarbon ratio.

In general, the pressure in the thermal cracking step is in the range of 0.9 to 3.0 bar (absolute), preferably at least 1.0 bar, more preferably at least 1.1 bar or 1.2 bar, and preferably at most 2.5 bar, more preferably at most 2.2 bar or 2.0 bar. In an embodiment, the pressure in the thermal cracking step is in the range from 1.5 to 2.5 bar, preferably from 1.9 to 2.5 bar. Selecting a pressure from the upper end of the range favours secondary reactions promoting formation of light olefins.

In an embodiment, the steam cracking is performed at a flow rate ratio between water and the blend ($H_2O$ flow rate [kg/h]/HC flow rate [kg/h]) of 0.20 to 0.80, and at a COT selected from the range from 700 to 960° C. In a further embodiment, the steam cracking is performed at a flow rate ratio between water and the blend ($H_2O$ flow rate [kg/h]/HC flow rate [kg/h]) of 0.30 to 0.60, and at a COT selected from the range from 780 to 860° C. A particularly favourable product distribution is obtained using the above process parameters.

In a preferred embodiment, the method comprises providing a renewable paraffin composition containing at least 25 wt-% multiple branched isoparaffins, the total amount of isoparaffins in the renewable paraffin composition being at least 75 wt-%, combining fossil naphtha comprising 20-85 wt-% paraffins, 0-35 wt-% olefins, 5-30 wt-% naphthenes, and 0-30 wt-% aromatics with the renewable isomeric paraffin composition to form a blend comprising 25-70 wt-%, preferably 25-65 wt-% fossil naphtha, the sum of the wt-% amounts of the renewable paraffin composition and of the fossil naphtha in the blend being at least 95 wt-% of the total weight of the blend, and thermally cracking the blend at a COT selected from the range from 820 to 840° C., a flow rate ratio between water and the blend ($H_2O$ flow rate [kg/h]/HC flow rate [kg/h]) selected from the range from 0.30 to 0.60, and a pressure selected from the range from 1.5 to 2.5 bar absolute (0.15-0.25 MPa). Performing the method according to this embodiment produces a mixture of hydrocarbons comprising at least 60 wt-%, such as at least 63 wt-% HVCs (propene, ethene, 1,3-butadiene, benzene, toluene, and xylenes) of the total weight of the mixture of hydrocarbons.

In a particularly preferred embodiment, the method comprises providing a renewable paraffin composition containing at least 25 wt-% multiple branched isoparaffins, the total amount of isoparaffins in the renewable paraffin composition being at least 75 wt-%, combining fossil naphtha comprising 20-85 wt-% paraffins, 0-35 wt-% olefins, 5-30 wt-% naphthenes, and 0-30 wt-% aromatics with the renewable isomeric paraffin composition to form a blend comprising 25-65 wt-% fossil naphtha, the sum of the wt-% amounts of the renewable paraffin composition and of the fossil naphtha in the blend being at least 95 wt-% of the total weight of the blend, and thermally cracking the blend at a COT of approximately 840° C., a flow rate ratio between water and the blend ($H_2O$ flow rate [kg/h]/HC flow rate [kg/h]) selected from the range from 0.30 to 0.60, and a pressure selected from the range from 1.5 to 2.0 bar absolute (0.15-0.20 MPa). Performing the method according to this embodiment produces a mixture of hydrocarbons comprising at least 65 wt-%, such as at least 66 wt-% HVCs (propene, ethene, 1,3-butadiene, benzene, toluene, and xylenes) of the total weight of the mixture of hydrocarbons. Further, performing the method according to this embodiment produces a mixture of hydrocarbons comprising at least 10 wt-% BTX (benzene, toluene, and xylenes) of the total weight of the mixture of hydrocarbons.

Cracking Products

The term "cracking products" may refer to products obtained directly after a thermal cracking step, or to derivatives thereof, i.e. "cracking products" as used herein refers to the hydrocarbon species in the mixture of hydrocarbons, and their derivatives. "Obtained directly after a thermal cracking step" may be interpreted as including optional separation and/or purification steps. As used herein, the term "cracking product" may also refer to the mixture of hydrocarbons obtained directly after the thermal cracking step as such.

The present invention provides a mixture of hydrocarbons obtainable by the method according to the first aspect of the invention. The mixture of hydrocarbons corresponds to the mixture which is directly obtained after thermal cracking without further purification.

Carbon atoms of renewable origin comprise a higher number of $^{14}C$ isotopes compared to carbon atoms of fossil origin. Therefore, it is possible to distinguish hydrocarbons of renewable origin from non-renewable hydrocarbons by analysing the ratio of $^{12}C$ and $^{14}C$ isotopes. By analysing the ratio of $^{12}C$ and $^{14}C$ isotopes it can also be determined whether or not feedstock comprising paraffins of renewable origin has been used in thermal cracking. Thus, a particular ratio of said isotopes can be used as a "tag" to identify hydrocarbons of renewable origin and differentiate them from non-renewable hydrocarbons. Because the isotope ratio does not change in the course of chemical reactions, the isotope ratio and, consequently, renewable origin of the hydrocarbons, can be detected also in chemicals and/or polymers derived from the hydrocarbons obtainable by the method of the first aspect.

The present invention further provides use of the mixture of hydrocarbons for producing chemicals and/or polymers. Use of the mixture of hydrocarbons for producing chemicals and/or polymers may comprise a separation step to separate at least one hydrocarbon compound from the mixture of hydrocarbons.

The cracking products described herein are examples of cracking products obtainable with the present invention. The cracking products of a certain embodiment may include one or more of the cracking products described in the following.

In a preferred embodiment, the cracking products include one or more of hydrogen, methane, ethane, ethene, propane, propene, propadiene, butane and butylenes, such as butene, iso-butene, and butadiene, C5+ hydrocarbons, such as aromatics, benzene, toluene, xylenes, and C5-C18 paraffins or olefins, and their derivatives.

Such derivatives are, for example, methane derivatives, ethene derivatives, propene derivatives, benzene derivatives, toluene derivatives, and xylene derivatives, and their derivatives.

Methane derivatives include, for example, ammonia, methanol, phosgene, hydrogen, oxochemicals and their derivatives, such as methanol derivatives. Methanol derivatives include, for example, methyl methacrylate, polymethyl methacrylate, formaldehyde, phenolic resins, polyurethanes, methyl-tert-butyl ether, and their derivatives.

Ethene derivatives include, for example, ethylene oxide, ethylene dichloride, acetaldehyde, ethylbenzene, alpha-olefins, and polyethylene, and their derivatives, such as ethylene oxide derivatives, ethylbenzene derivatives, and acetaldehyde derivatives. Ethylene oxide derivatives include, for example, ethylene glycols, ethylene glycol ethers, ethylene glycol ethers acetates, polyesters, ethanol amines, ethyl carbonates and their derivatives. Ethylbenzene derivatives include, for example, styrene, acrylonitrile butadiene styrene, styrene-acrylonitrile resin, polystyrene, unsaturated polyesters, and styrene-butadiene rubber, and their derivatives. Acetaldehyde derivatives include, for example, acetic acid, vinyl acetate monomer, polyvinyl acetate polymers, and their derivatives. Ethyl alcohol derivatives include, for example, ethyl amines, ethyl acetate, ethyl acrylate, acrylate elastomers, synthetic rubber, and their derivatives. Further, ethene derivatives include polymers, such as polyvinyl chloride, polyvinyl alcohol, polyester such as polyethylene terephthalate, polyvinyl chloride, polystyrene, and their derivatives.

Propene derivatives include, for example, isopropanol, acrylonitrile, polypropylene, propylene oxide, acrylic acid, allyl chloride, oxoalcohols, cumens, acetone, acrolein, hydroquinone, isopropylphenols, 4-hethylpentene-1, alkylates, butyraldehyde, ethylene-propylene elastomers, and their derivatives. Propylene oxide derivatives include, for example, propylene carbonates, allyl alcohols, isopropanolamines, propylene glycols, glycol ethers, polyether polyols, polyoxypropyleneamines, 1,4-butanediol, and their derivatives. Allyl chloride derivatives include, for example, epichlorohydrin and epoxy resins. Isopropanol derivatives include, for example, acetone, isopropyl acetate, isophorone, methyl methacrylate, polymethyl methacrylate, and their derivatives. Butyraldehyde derivatives include, for example, acrylic acid, acrylic acid esters, isobutanol, isobutylacetate, n-butanol, n-butylacetate, ethylhexanol, and their derivatives. Acrylic acid derivatives include, for example, acrylate esters, polyacrylates and water absorbing polymers, such as super absorbents, and their derivatives.

Butylene derivatives include, for example, alkylates, methyl tert-butyl ether, ethyl tert-butyl ether, polyethylene copolymer, polybutenes, valeraldehyde, 1,2-butylene oxide, propylene, octenes, sec-butyl alcohol, butylene rubber, methyl methacrylate, isobutylenes, polyisobutylenes, substituted phenols, such as p-tert-butylphenol, di-tert-butyl-p-cresol and 2,6-di-tert-butylphenol, polyols, and their derivatives. Other butadiene derivatives may be styrene butylene rubber, polybutadiene, nitrile, polychloroprene, adiponitrile, acrylonitrile butadiene styrene, styrene-butadiene copolymer latexes, styrene block copolymers, styrene-butadiene rubber.

Benzene derivatives include, for example, ethyl benzene, styrene, cumene, phenol, cyclohexane, nitrobenzene, alkylbenzene, maleic anhydride, chlorobenzene, benzene sulphonic acid, biphenyl, hydroquinone, resorcinol, polystyrene, styrene-acrylonitrile resin, styrene-butadiene rubber, acrylonitrile-butadiene-styrene resin, styrene block copolymers, bisphenol A, polycarbonate, methyl diphenyl diisocyanate and their derivatives. Cyclohexane derivatives include, for example, adipic acid, caprolactam and their derivatives. Nitrobenzene derivatives include, for example, aniline, methylene diphenyl diisocyanate, polyisocyanates and polyurethanes. Alkylbenzene derivatives include, for example, linear alkybenzene. Chlorobenzene derivatives include, for example, polysulfone, polyphenylene sulfide, and nitrobenzene. Phenol derivatives include, for example, bisphenol A, phenol form aldehyde resins, cyclohexanone-cyclohexenol mixture (KA-oil), caprolactam, polyamides, alkylphenols, such as p-nonoylphenol and p-dedocylphenol, ortho-xylenol, aryl phosphates, o-cresol, and cyclohexanol.

Toluene derivatives include, for example, benzene, xylenes, toluene diisocyanate, benzoic acid, and their derivatives.

Xylene derivatives include, for example, aromatic diacids and anhydrates, such as terephthalic acid, isophthalic acid, and phthalic anhydride, and phthalic acid, and their derivatives. Derivatives of terephthalic acid include, for example, terephthalic acid esters, such as dimethyl terephthalate, and polyesters, such as polyethylene terephthalate, polytrimethylene terephthalate, polybutylene terephthalate and polyester polyols. Phthalic acid derivatives include, for example, unsaturated polyesters, and PVC plasticizers. Isophthalic acid derivatives include, for example, unsaturated polyesters, polyethylene terephthalate co-polymers, and polyester polyols.

The hydrocarbons obtained or obtainable with the method according to the first aspect of the present invention are particularly suitable as raw materials for conventional petrochemistry, and polymer industry. Specifically, the mixture of hydrocarbons obtained from the present invention show a product distribution which is similar to, and even favourable over, the product distribution obtained from thermal (steam) cracking of conventional raw material, i.e. neat fossil raw material. Thus, these hydrocarbons can be added to the known value-added chain while no significant modifications of production processes are required.

The cracking products of the current invention may be used in a wide variety of applications. Such applications are, for example, consumer electronics, composites, automotive, packaging, medical equipment, agrochemicals, coolants, footwear, paper, coatings, adhesives, inks, pharmaceuticals, electric and electronic appliances, sport equipment, disposables, paints, textiles, super absorbents, building and construction, fuels, detergents, furniture, sportwear, solvents, plasticizers and surfactants.

EXAMPLES

Composition Analysis of the Renewable Paraffin Compositions

N- and i-paraffin contents in the renewable paraffin composition were analyzed by gas chromatography (GC). The renewable paraffin composition samples were analyzed as such, without any pretreatment. The method is suitable for hydrocarbons C2-36. N-alkanes and groups of isoalkanes (C1-, C2-, C3-substituted and ≥C3-substituted) were identified using mass spectrometry and a mixture of known n-alkanes in the range of C2-C36. The chromatograms were integrated and compounds or compound groups were quantified by normalization using relative response factor of 1.0 to all hydrocarbons. The limit of quantitation for individual compounds was 0.01 wt-%. Settings of the GC are shown in Table 1.

TABLE 1

| Settings of GC determination of n- and i-paraffins | |
|---|---|
| GC | |
| Injection | split/splitless-injector Split 80:1 (injection volume 0.2 μL) |
| Column | DB™-5 (length 30 m, i.d. 0.25 m, phase thickness 0.25 μm) |

TABLE 1-continued

| Settings of GC determination of n- and i-paraffins | |
|---|---|
| GC | |
| Carrrie gas | He |
| Detector | FID (flame ionization detector) |
| GC program | 30° C. (2 min)-5° C./min-300° C. (30 min), constant flow 1.1 mL/min |

Renewable Paraffin Composition P1

A mixture (renewable paraffin composition) comprising 11 wt-% isoparaffins (total iP, i.e the combined wt-% amounts of monobranched isoparaffins and multiple branched isoparaffins) and 89 wt-% n-paraffins was provided. The amount of multiple branched isoparaffins in composition P1 was about 10 wt-%. The ratio of the wt-% amount multiple branched isoparaffins to the combined wt-% amounts of n-paraffins and monobranched isoparaffins of composition P1 was 0.11. The composition was analyzed as described above. The analysis results are shown in Table 2.

Composition P1 corresponds to a hydrocarbon composition (heavy fraction) derived from a renewable feedstock based on oils and fats subjected to hydrotreating and isomerization.

Renewable Paraffin Composition P2

A mixture (renewable paraffin composition) comprising about 69 wt-% isoparaffins (total iP), and about 31 wt-% n-paraffins was provided. The amount of multiple branched isoparaffins in composition P2 was about 15 wt-%. The ratio of the wt-% amount of multiple branched isoparaffins to the combined wt-% amounts of n-paraffins and monobranched isoparaffins of composition P2 was 0.18. The composition was analyzed as described above. The analysis results are shown in Table 2.

Composition P2 corresponds to a hydrocarbon composition (heavy fraction) derived from a renewable feedstock based on oils and fats subjected to hydrotreating and isomerization. The isomerization was performed so that a composition having a higher degree (wt-% amount) of isoparaffins and a higher (wt-%) amount of multiple branched isoparaffins than P1 was obtained.

Renewable Paraffin Composition P3

A mixture (renewable paraffin composition) comprising about 93 wt-% isoparaffins (total iP) and 7 wt-% n-paraffins was provided. The amount of multiple branched isoparaffins in composition P3 was about 52 wt-%. The ratio of the wt-% amount of multiple branched isoparaffins to the combined wt-% amounts of n-paraffins and monobranched isoparaffins of composition P3 is 1.08. The composition was analyzed as described above. The results of the analysis are shown in Table 2.

Composition P3 corresponds to a hydrocarbon composition (heavy fraction) derived from a renewable feedstock which is subjected to hydrotreating and isomerization. The isomerization was performed so that a composition having a higher degree (wt-% amount) of isoparaffins and a higher (wt-%) amount of multiple branched isoparaffins than P1 and P2 was obtained.

TABLE 2

Paraffin composition of samples P1, P2, and P3

| | P1 | | | P2 | | | P3 | | |
|---|---|---|---|---|---|---|---|---|---|
| Carbon number | nP (%) | multiple iP (%) | total iP (%) | nP (%) | multiple iP (%) | total iP (%) | nP (%) | multiple iP (%) | total iP (%) |
| 2 | 0.00 | 0.00 | 0.00 | 0.00 | 0.00 | 0.00 | 0.00 | 0.00 | 0.00 |
| 3 | 0.00 | 0.00 | 0.00 | 0.00 | 0.00 | 0.00 | 0.00 | 0.00 | 0.00 |
| 4 | 0.00 | 0.00 | 0.01 | 0.00 | 0.00 | 0.00 | 0.01 | 0.00 | 0.01 |
| 5 | 0.00 | 0.00 | 0.04 | 0.00 | 0.00 | 0.00 | 0.02 | 0.00 | 0.04 |
| 6 | 0.01 | 0.00 | 0.04 | 0.06 | 0.00 | 0.03 | 0.05 | 0.00 | 0.12 |
| 7 | 0.04 | 0.00 | 0.06 | 0.14 | 0.00 | 0.21 | 0.09 | 0.00 | 0.51 |
| 8 | 0.10 | 0.00 | 0.06 | 0.14 | 0.00 | 0.23 | 0.26 | 0.00 | 0.76 |
| 9 | 0.03 | 0.00 | 0.06 | 0.16 | 0.00 | 0.27 | 0.23 | 0.00 | 0.91 |
| 10 | 0.06 | 0.00 | 0.07 | 0.15 | 0.00 | 0.30 | 0.19 | 0.00 | 0.93 |
| 11 | 0.05 | 0.04 | 0.04 | 0.15 | 0.10 | 0.29 | 0.15 | 0.27 | 1.08 |
| 12 | 0.12 | 0.05 | 0.05 | 0.19 | 0.11 | 0.31 | 0.13 | 0.41 | 1.12 |
| 13 | 0.36 | 0.07 | 0.07 | 0.25 | 0.12 | 0.39 | 0.11 | 0.48 | 1.73 |
| 14 | 1.25 | 0.17 | 0.17 | 0.43 | 0.16 | 0.65 | 0.35 | 0.81 | 9.88 |
| 15 | 4.95 | 0.60 | 0.60 | 5.57 | 1.61 | 8.20 | 1.53 | 4.74 | 26.60 |
| 16 | 16.72 | 1.64 | 1.64 | 9.58 | 3.79 | 18.85 | 1.60 | 14.97 | 15.40 |
| 17 | 15.42 | 2.12 | 2.12 | 5.26 | 2.97 | 13.27 | 1.88 | 7.86 | 31.77 |
| 18 | 47.79 | 4.63 | 4.63 | 8.73 | 5.91 | 24.94 | 0.79 | 21.63 | 0.47 |
| 19 | 0.50 | 0.34 | 0.34 | 0.06 | 0.10 | 0.30 | 0.04 | 0.32 | 0.39 |
| 20 | 0.95 | 0.15 | 0.15 | 0.06 | 0.09 | 0.31 | 0.02 | 0.27 | 0.11 |
| 21 | 0.08 | 0.07 | 0.07 | 0.01 | 0.01 | 0.04 | 0.01 | 0.06 | 0.12 |
| 22 | 0.17 | 0.06 | 0.06 | 0.01 | 0.02 | 0.05 | 0.01 | 0.07 | 0.09 |
| 23 | 0.04 | 0.02 | 0.02 | 0.01 | 0.01 | 0.04 | 0.01 | 0.05 | 0.09 |
| 24 | 0.07 | 0.01 | 0.01 | 0.01 | 0.02 | 0.06 | 0.01 | 0.06 | 0.01 |
| 25 | 0.03 | 0.00 | 0.00 | 0.00 | 0.00 | 0.00 | 0.00 | 0.01 | 0.00 |
| >C25 | 0.00 | 0.00 | 0.00 | 0.00 | 0.00 | 0.28 | 0.00 | 0.00 | 0.39 |
| Total | 88.73 | 9.97 | 11.27 | 30.96 | 15.02 | 69.04 | 7.48 | 52.00 | 92.52 |

In Table 2, total iP denotes all isoparaffins, multiple iP denotes multiple branched isoparaffins, and nP denotes n-paraffins.

Composition Analysis of Fossil Naphtha

The composition of the fossil naphtha samples were analyzed by gas chromatography according to the EN ISO 22854-2016 (ASTM D 6839-2016) method. The method is suitable for analyzing saturated, olefinic, and aromatic hydrocarbons in gasoline fuels. The density of the naphtha samples were analyzed according to the EN-ISO-12185 (2011) method. The boiling point of the naphtha samples were analyzed according to the EN-ISO-3405 (2011) method.

Naphtha N1 and Naphtha N2

Naphtha N1 is a typical fossil light naphtha feedstock for steam crackers. Naphtha N2 represents heavier fossil naphtha feedstock. Characteristics of the fossil naphtha feedstocks N1 and N2 are shown in Table 3.

TABLE 3

Characteristics of the fossil naphtha samples

| Property | N1 | N2 |
|---|---|---|
| Density (kg/m$^3$) | 674.2 | 758.1 |
| Boiling point | | |
| Initial boiling point IBP (° C.) | 35.7 | 50.0 |
| End point EP (° C.) | 85.0 | 185.8 |
| Paraffins (vol-%) | 81.0 | 29.8 |
| Olefins (vol-%) | 0.5 | 31.7 |
| Naphthenes (vol-%) | 16.8 | 11.8 |
| Aromatics (vol-%) | 1.7 | 26.4 |

Pour Point Measurements

The pour point measurements were carried out according to the ASTM D5950-14 standard and using an ISL CPP 5G analyzer. The measuring frequency was 3° C. The reported pour points are an average of three individual measurements.

Pour point is the temperature below which a liquid loses its flow characteristics. Typical steam crackers do not have heated feedstock tanks or feed pipelines. Therefore, the pour point of the feedstock is an important factor to ensure the operability of the crackers at all weather conditions. To ensure the operability of the cracker around the year in locations where the temperature changes with seasons, i.e. at cold temperatures, a feedstock having its pour point well below 0° C. should be chosen.

Table 4 shows the pour point temperatures for the renewable paraffin compositions P1, P2, and P3, and the fossil naphtha samples N1 and N2. The pour points for P1, P2 and P3 are 21° C., −3° C., and −54° C., respectively. As can be seen, an increase in the isomerization degree improves the cold properties of the renewable paraffin composition. Correspondingly, a higher n-paraffins (wt-%) content of the renewable paraffin composition results in higher pour point temperatures. A pour point of well below 0° C., preferably −20° C. and below, can be considered adequate for naphtha cracker feedstocks used during winter time. Because of their pour points, P1 and P2 can be considered unsuitable feedstocks as such for typical crackers without significant investments in feedstock logistics at low ambient temperatures, such as −20° C. Fossil naphtha samples N1 and N2 have pour points that are below −105° C. Such low pour points are very well suited for use as feedstock for naphtha crackers.

The density at 15° C. of samples P1, P2, P3, N1 and N2 were analyzed according to the EN-ISO-12185 (1996) method, and the results are shown in table 4. As can be seen, at 15° C. the compositions P2 and P3 in liquid form have a higher density than N1 and N2.

TABLE 4

Pour points and densities of P1, P2, P3, N1, and N2

| Material | Density at 15° C. (kg/m3) | Pour point (° C.) |
|---|---|---|
| P3 | 779.0 | −54 |
| P2 | 779.1 | −3 |
| P1 | solid | 21 |
| N1 | 674.2 | <−105 |
| N2 | 759.8 | <−105 |

Example 1—Pour Point

Low temperature performance characteristics of blends containing a renewable paraffin compositions and fossil naphtha were studied in a laboratory scale setup at atmospheric pressure.

Fossil naphtha was poured on top of a renewable paraffin composition in a glass flask. The flask was shaken until an even blend (upon visual inspection) was formed. Samples were made so that one of naphtha samples N1 and N2, and one of the renewable paraffin compositions P1, P2, and P3 were chosen per flask. P1, P2, and P3 formed single phase mixtures with N1 and N2 in blend rations from 0 wt-% to 100 wt-% naphtha once sufficient mixing and time was applied and when the temperature was above the pour point of the blend.

FIG. 1 shows the pour points of the blends. As can be seen from FIG. 1, all blends comprising P3 had a pour point below −50° C. confirming good low temperature operability, or cold properties, at all P3/N1 and P3/N2 blending ratios. As for P2, having a lower degree of isomerization than P3, i.e. comprising less (wt-%) isoparaffins, the cold properties of the P2/N1 and P2/N2 mixtures benefited from an increase in the wt-% amount of fossil naphtha in the blends. Blends comprising P2 and containing more than 50 wt-% fossil naphtha N1 or N2 had a pour point below −20° C. Blends in which the renewable paraffin composition was P1 had the poorest cold properties, as said mixtures obtained a pour point of below −20° C. only when the amount of naphtha N1 or N2 was at least 90 wt-%.

Example 2—Blendability

A test series was performed to demonstrate the blending characteristics of the renewable paraffin compositions P1, P2, and P3 having different degrees of isomerization, i.e. containing different wt-% amounts of isoparaffins, with fossil naphtha N1 and N2.

Figure 2:
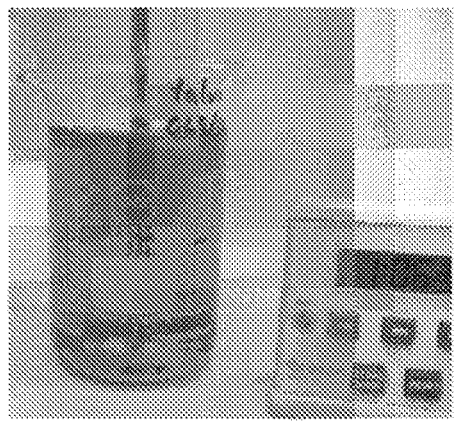
FIG. 2a) shows a picture of blend 1 after 66 minutes blending as described in the Examples.
FIG. 2b) shows a picture of blend 2 after 66 minutes blending as described in the Examples.
FIG. 2c) shows a picture of blend 3 after 70 minutes blending as described in the Examples.
Figure 2:
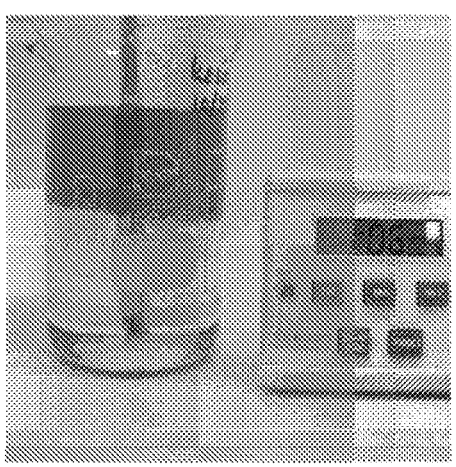
Figure 2:
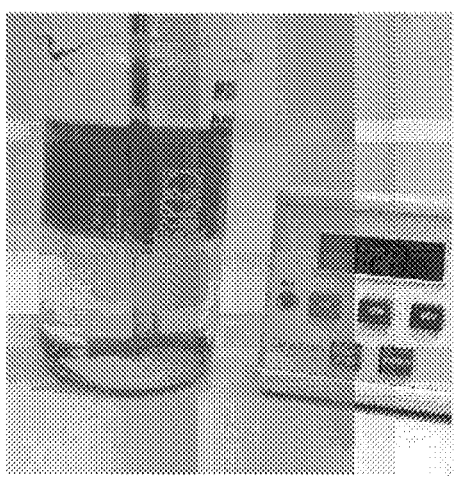

The test setup is shown in FIG. 2. The fossil naphtha was dyed red (Euromarker RED MCNY 25) to facilitate visual inspection of the systems. The test was carried out by carefully pouring a layer (50 ml) of fossil naphtha on top of a renewable paraffin composition (100 ml) in a glass beaker at room temperature. Constant mixing (100 rpm) was introduced with a blade mixer in the bottom of the beaker, i.e. initially at the bottom of the renewable paraffin composition phase. The beaker was covered with aluminum foil to reduce evaporation of the fossil naphtha phase. The time to completely mix the two separate phases, i.e to form an even colored single phase red blend, was determined by visual inspection. Said times to complete mixing are shown in Table 3.

The performed tests demonstrated that an increased isomerization degree, i.e. increased wt-% amount of isoparaffins, of the renewable paraffin composition improves the miscibility of the renewable paraffin composition in fossil naphtha and reduces the risk of formation of two or multiple phase systems. In other words, an increase in the isomerization degree of the renewable paraffin composition improves its miscibility in fossil naphtha and reduces the blends tendency to form two or multiple phase systems. Table 3 shows that mixing of the renewable paraffin composition with fossil naphtha samples N1 and N2 is fastest for P3, followed by P2 containing less isoparaffins than P3. The least isomerized renewable paraffin composition P1 has the poorest miscibility in both fossil naphtha samples N1 and N2.

TABLE 3

Mixing times

| | Bottom phase | Top phase | Time to complete mixing [min] |
|---|---|---|---|
| Blend 1 | P3 (100 ml) | N1 (50 ml) | 157 |
| Blend 2 | P2 (100 ml) | N1 (50 ml) | 171 |
| Blend 3 | P1 (100 ml) | N1 (50 ml) | 218 |
| Blend 4 | P3 (100 ml) | N2 (50 ml) | 16 |
| Blend 5 | P2 (100 ml) | N2 (50 ml) | 19 |
| Blend 6 | P1 (100 ml) | N2 (50 ml) | 24 |

The examples show that an increase in the wt-% amount of isoparaffins in the renewable paraffin composition enhances the blendability of the renewable paraffin composition with fossil naphtha and reduces the mixing time, i.e. the time required to form an even, single phase blend of the renewable paraffin composition and fossil naphtha. Particularly, the increase in the wt-% amount of multiple branched isoparaffins is considered to enhance the mixing of renewable paraffin composition and fossil naphtha. Further, the blends containing a renewable paraffin composition and fossil naphtha have a lower pour point than non-blended (100 wt-%) renewable paraffin composition. Increasing the wt-% amount of fossil naphtha in the blend reduces the pour point of the blend. It is thus beneficial to use a blend of a highly isomerized renewable paraffin composition and fossil naphtha in a cracker feed tank. Providing a highly isomerized renewable paraffin composition derived from oils and fats and combining it with fossil naphtha to form a blend reduces the risk for phase separation in the formed blend, as well as solidification of the blend at low ambient temperatures. Such blends are beneficial as thermal cracker feeds.

Example 3—Steam Cracking

Blends for steam cracking were prepared by mixing N1 with P1, P2 and P3 respectively. Sufficient mixing and time was applied so that all the blends had a single liquid phase. The prepared blends and their compositions are shown in Table 4.

TABLE 4

Composition of the blends for steam cracking

| Feedstock | Fossil naphtha/wt-% | Renewable paraffin/wt-% |
|---|---|---|
| Blend 7 | N1/25 | P1/75 |
| Blend 8 | N1/25 | P2/75 |
| Blend 9 | N1/25 | P3/75 |

Steam cracking of blends 7-9 and of unblended fossil naphtha N1 was carried out on a bench scale steam cracking equipment. The main parts of the steam cracking unit, the analytical equipment and the calibration procedure used in Example 3 have been described in detail in the following publications K. M. Van Geem, S. P. Pyl, M. F. Reyniers, J. Vercammen, J. Beens, G. B. Marin, On-line analysis of complex hydrocarbon mixtures using comprehensive two-dimensional gas chromatography, Journal of Chromatography A. 1217 (2010) 6623-6633 and J. B. Beens, U. A. T. Comprehensive two-dimensional gas chromatography—a powerful and versatile technique. Analyst. 130 (2005) 123-127.

Figure 3:
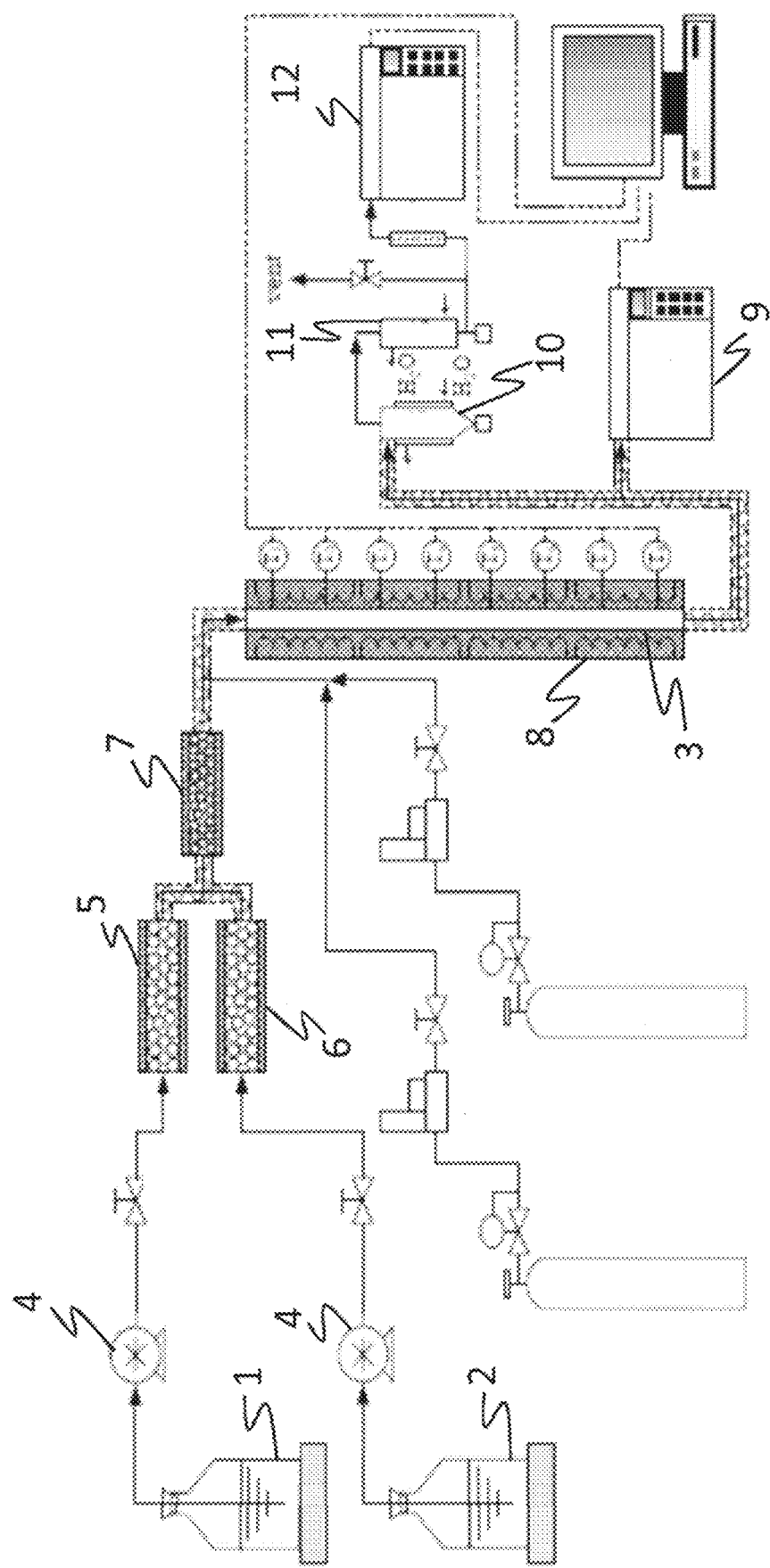
FIG. 3 shows a schematic drawing of a bench scale steam cracking setup used in an Example.

The bench scale steam cracking setup of Example 3 is briefly described in the following with reference to FIG. 3. The feed section controls the supply of the feedstock and the water from reservoirs 1 and 2, respectively, to the reactor coil 3. The flow of liquids was regulated by coriolis flow meter controlled pumps 4 (Bronkhorst, The Netherlands) equipped with Bronkhorst™ CORI-FLOW™ series mass flow metering instruments to provide high accuracy: ±0.2% of reading. CORI-FLOW™ mass flow metering instruments utilizes an advanced Coriolis type mass flow sensor to achieve reliable performance, even with changing operating conditions, e.g. pressure, temperature, density, conductivity and viscosity. The pumping frequency was automatically adjusted by the controller of the CORI-FLOW™ flow metering instrument. The mass flow rate, which contrary to the volume flow rate is not affected by changes in temperature or pressure, of all feeds was measured every second, i.e. substantially continuously. Steam was used as a diluent and was heated to the same temperature as the evaporated feedstock. Both the feedstock and the steam were heated in electrically heated ovens 5 and 6, respectively. Downstream from ovens 5 and 6, the feedstock and the steam were mixed in an electrically heated oven 7 filled with quartz beads, which enabled an efficient and uniform mixing of feedstock and the diluent prior to entering the reactor coil 3. The mixture of feedstock and diluent steam entered the reactor coil 3 placed vertically in a rectangular electrically heated furnace 8. Eight thermocouples T positioned along the axial reactor coordinate measured the process gas temperature at different positions. The rectangular furnace 8 was divided into eight separate sections which could be controlled independently to set a specific temperature profile. The pressure in the reactor coil 3 was controlled by a back pressure regulator (not shown) positioned downstream from the outlet of the reactor coil 3. Two pressure transducers (not shown), placed at the inlet and outlet of the reactor, indicated the coil inlet (CIP) and the coil outlet pressure (COP), respectively. At the reactor outlet, nitrogen was injected to the reactor effluent as an internal standard for analytical measurements and to a certain extent contribute to the quenching of the reactor effluent. The reactor effluent was sampled online, i.e. during operation of the steam cracking setup, at a high temperature (350° C.). Namely, via a valve-based sampling system and uniformly heated transfer lines a gaseous sample of the reactor effluent was injected into a comprehensive two-dimensional gas chromatograph (GC×GC) 9 coupled to a Flame Ionization detector (FID) and a Mass Spectrometer (MS). A high temperature 6-port 2-way sampling valve of the valve-based sampling system was placed in an oven, where the temperature was kept above the dew point of the effluent sample. Further downstream the reactor effluent was cooled to approximately 80° C. Water and condensed heavier products (pyrolysis gasoline (PyGas) and pyrolysis fuel oil (PFO)) were removed by means of a knock-out vessel 10 and a cyclone 11, while the remainder of the effluent stream was sent directly to a vent. Before reaching the vent, a fraction of the effluent was withdrawn for analysis on a Refinery Gas Analyzer (RGA) 12. After removal of all remaining water using a water-cooled heat exchanger and dehydrator, this effluent fraction was injected automatically onto the so-called Refinery Gas Analyzer (RGA) 12 using a built-in gas sampling valve system (80° C.).

Steam Cracking Example S1-S3

Bench scale steam cracking was performed using blend 7 as feedstock at three coil outlet temperatures (COTs), 800° C., 820° C., and 840° C. The dilution was 0.5 (flow rate ratio of water to feedstock; water [kg/h]/feedstock [kg/h]) and the pressure was 1.7 bar absolute (0.17 MPa) at all COTs. The steam cracking reactor was a 1.475 m long tubular reactor made of Incoloy 800HT™ steel (30-35 wt-% Ni, 19-23 wt-% Cr, >39.5 wt-% Fe) having an inner diameter of 6 mm. The flow rate of the feedstock was 150 g/h. The product mixtures (mixtures of hydrocarbons, reactor effluents) were analyzed by GC×GC, as described above. The results of the effluent analysis are shown in Table 5.

Steam Cracking Examples S4 to S6

Steam cracking was carried out similar to steam cracking examples S1-S3, except for changing the feedstock to blend 8, as indicated in Table 5. The product mixtures (mixtures of hydrocarbons, reactor effluents) were analyzed by GC×GC, as described above. The results of the effluent analyses are shown in Table 5.

Steam Cracking Examples S4 to S6

Steam cracking was carried out similar to steam cracking examples S1-S3, except for changing the feedstock to blend 9, as indicated in Table 5. The product mixtures (mixtures of hydrocarbons, reactor effluents) were analyzed by GC×GC, as described above. The results of the effluent analyses are shown in Table 5.

Steam Cracking Examples S10 to S12

Steam cracking was carried out similar to steam cracking examples S1-S3, except for changing the feedstock to N1 and the COTs to 820° C., 850° C., and 880° C. as indicated in Table 6. The product mixtures (reactor effluents) were analyzed by GC×GC as described above. The results from the effluent analyses are shown in Table 6.

TABLE 5

Steam cracking conditions and effluent analysis results for steam cracking examples S1 to S9.

| | Example # | | | | | | | | |
|---|---|---|---|---|---|---|---|---|---|
| | S1 | S2 | S3 | S4 | S5 Feedstock | S6 | S7 | S8 | S9 |
| | Blend 7 | Blend 7 | Blend 7 | Blend 8 | Blend 8 | Blend 8 | Blend 9 | Blend 9 | Blend 9 |
| COT (° C.) | 800 | 820 | 840 | 800 | 820 | 840 | 800 | 820 | 840 |
| Dillution (gH2O/gHC) | 0.5 | 0.5 | 0.5 | 0.5 | 0.5 | 0.5 | 0.5 | 0.5 | 0.5 |
| hydrogen | 0.45 | 0.56 | 0.65 | 0.52 | 0.59 | 0.68 | 0.49 | 0.65 | 0.71 |
| methane | 7.71 | 9.24 | 10.19 | 9.18 | 10.46 | 11.20 | 8.96 | 11.18 | 11.86 |
| ethene | 27.03 | 31.52 | 33.73 | 27.06 | 27.78 | 30.56 | 23.57 | 29.12 | 30.29 |
| propene | 17.54 | 18.35 | 17.73 | 18.85 | 17.80 | 17.69 | 18.26 | 19.51 | 18.47 |
| 1,3-butadiene | 5.59 | 6.39 | 6.64 | 5.98 | 6.11 | 6.31 | 5.46 | 6.39 | 6.60 |
| benzene | 4.33 | 5.95 | 6.09 | 4.43 | 5.96 | 7.85 | 3.93 | 6.49 | 8.08 |
| toluene | 1.22 | 1.32 | 1.17 | 1.29 | 1.89 | 2.09 | 1.14 | 1.91 | 2.70 |
| xylenes | 0.14 | 0.08 | 0.08 | 0.14 | 0.18 | 0.16 | 0.18 | 0.10 | 0.15 |
| others | 35.99 | 26.59 | 23.72 | 32.55 | 29.23 | 23.45 | 38.00 | 24.64 | 21.15 |
| C5+ total | 28.15 | 23.72 | 21.14 | 27.50 | 24.20 | 21.57 | 27.41 | 19.01 | 19.25 |
| BTX (benzene, toluene, xylenes) | 5.68 | 7.36 | 7.34 | 5.86 | 8.03 | 10.10 | 5.25 | 8.50 | 10.93 |
| HVC (ethene, propene, butadiene, BTX) | 55.85 | 63.61 | 65.44 | 57.75 | 59.72 | 64.67 | 52.55 | 63.52 | 66.29 |

TABLE 6

Steam cracking conditions and effluent analysis results for steam cracking examples S10 to S12.

| Example # | S10 | S11 | S12 |
|---|---|---|---|
| Feedstock | N1 | N1 | N1 |
| COT (° C.) | 820 | 850 | 880 |
| Dillution (gH2O/gHC) | 0.5 | 0.5 | 0.5 |
| hydrogen | 0.76 | 1.00 | 1.19 |
| methane | 9.85 | 14.01 | 15.72 |
| ethene | 21.31 | 29.03 | 30.85 |
| propene | 16.03 | 17.51 | 13.96 |
| 1,3-butadiene | 4.37 | 4.95 | 4.52 |
| benzene | 4.47 | 5.78 | 9.95 |
| toluene | 0.12 | 0.12 | 0.54 |
| xylenes | 0.64 | 1.14 | 1.95 |
| others | 42.45 | 26.46 | 21.32 |
| C5+ total | 36.62 | 22.16 | 25.3 |
| BTX (benzene, toluene, xylenes] | 5.23 | 7.04 | 12.44 |
| HVC (ethene, propene, butadiene, BTX) | 46.94 | 58.53 | 61.77 |

As can be seen from Tables 5 and 6, the highest yield of HVCs (ethene, propene, 1,3-butadiene, benzene, toluene, and xylenes) was obtained with blend 9 as feedstock at COT 840° C. Also the highest BTX (benzene, toluene, and xylenes) yield was obtained with blend 9 as feedstock at COT 840° C. Steam cracking blend 9 at COTs 820 and 840° C. resulted in a higher yield of HVCs compared to the yield of HVCs obtained with N1 as feedstock at any of the COTs in steam cracking examples S10-S12.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The Following Aspects are Disclosed Herein:

1. A method for producing a mixture of hydrocarbons, the method comprising the steps of:
   (a) providing a renewable paraffin composition containing at least 75 wt-% isoparaffins;
   (b) combining fossil naphtha with the renewable paraffin composition to form a blend; and
   (c) thermally cracking the blend to produce a mixture of hydrocarbons.

2. The method according to aspect 1, wherein the renewable paraffin composition contains at least 80 wt-%, preferably at least 85 wt-%, more preferably at least 90 wt-% isoparaffins.

3. The method according to aspect 1 or 2, wherein the renewable paraffin composition contains at least 25 wt-% multiple branched isoparaffins, preferably at least 30 wt-% multiple branched isoparaffins, more preferably at least 35 wt-% multiple branched isoparaffins, and even more preferably at least 40 wt-% multiple branched isoparaffins.

4. The method according to any preceding aspect, wherein the renewable paraffin composition contains at least 90 wt-% paraffins, preferably at least 95 wt-% paraffins, and more preferably at least 99 wt-% paraffins.

5. The method according to any preceding aspect, wherein fossil naphtha is combined with the renewable paraffin composition such that the blend contains at least 1 wt-%, preferably at least 5 wt-%, more preferably at least 10 wt-%, and even more preferably at least 20 wt-% fossil naphtha, the sum of the wt-% amounts of the renewable paraffin composition and of the fossil naphtha in the blend preferably being at least 90 wt-%, more preferably at least 95 wt-%, and even more preferably at least 99 wt-%, of the total weight of the blend.

6. The method according to any preceding aspect, wherein fossil naphtha is combined with the renewable paraffin composition such that the blend contains at most 99 wt-%, preferably at most 95 wt-%, more preferably at most 90 wt-%, and even more preferably at most 80 wt-% fossil naphtha.

7. The method according to any preceding aspect, wherein the renewable paraffin composition and the fossil naphtha form one liquid phase above the pour point of the blend.

8. The method according to any preceding aspect, wherein the thermal cracking is steam cracking, and wherein thermally cracking the blend is preferably performed with a cracker for thermally cracking liquid fossil feeds.

9. The method according to any preceding aspect, wherein providing a renewable paraffin composition comprises
   (i) preparing a hydrocarbon raw material from a renewable feedstock; and
   (ii) subjecting at least straight chain hydrocarbons in the hydrocarbon raw material to an isomerization treatment to prepare the renewable paraffin composition; and
   wherein subjecting at least straight chain hydrocarbons in the hydrocarbon raw material to an isomerization treatment comprises controlling the isomerization degree of the renewable paraffin composition being prepared, and optionally controlling production of monobranched isoparaffins and multiple branched isoparaffins during the isomerization treatment.

10. The method according to aspect 9, wherein preparing a hydrocarbon raw material comprises
   subjecting the renewable feedstock to a deoxygenation treatment, wherein the deoxygenation treatment is preferably hydrotreatment, preferably hydrodeoxygenation; and/or
   hydrocracking hydrocarbons in the hydrocarbon raw material.

11. The method according to any preceding aspect, wherein the renewable paraffin composition comprises at least one of a heavy fraction having a boiling point ranging from 180 to 360° C. and a light fraction having a boiling point ranging from 30 to 180° C., and wherein the blend comprises the heavy fraction and/or the light fraction.

12. The method according to any preceding aspect, wherein the renewable paraffin composition is selected from one of fractions A and B, wherein;
   fraction A comprises more than 50 wt-%, preferably at least 75 wt-%, more preferably at least 90 wt-% C10-C20 hydrocarbons, the content of even-numbered hydrocarbons in the C10-C20 range being preferably more than 50 wt-%, and the fraction A containing at most 1.0 wt-%, preferably at most 0.5 wt-%, more preferably at most 0.2 wt.-% aromatics, and less than 2.0, preferably at most 1.0 wt-%, more preferably at most 0.5 wt-% olefins, and less than 10 wt-%, preferably less than 5 wt-%, and more preferably less than 3 wt-% napthenes; and
   fraction B comprises more than 50 wt-%, preferably at least 75 wt-%, more preferably at least 90 wt-% C5-C10 hydrocarbons, and the fraction B containing at most 1.0 wt-%, preferably at most 0.5 wt-%, more preferably at most 0.2 wt-% aromatics, and less than 2.0, preferably at most 1.0 wt.-%, more preferably at most 0.5 wt-% olefins, and less than 10 wt-%, preferably less than 5 wt-%, and more preferably less than 3 wt-% napthenes.

13. A blend for producing a mixture of hydrocarbons by thermal cracking, the blend containing a renewable paraffin composition and fossil naphtha,
   wherein the ratio of the wt-% amount isoparaffins of the renewable paraffin composition to the wt-% amount of n-paraffins of the renewable paraffin composition is at least 2.5, preferably at least 4.0, more preferably at least 5.5, even more preferably at least 9.0.

14. The blend according to aspect 13, wherein the ratio of the wt-% amount multiple branched isoparaffins of the renewable paraffin composition to the combined wt-% amounts of n-paraffins and monobranched isoparaffins of the renewable paraffin composition is at least 0.30, preferably at least 0.40, more preferably at least 0.50, even more preferably at least 0.65.

15. The blend according to aspect 13 or 14, wherein the blend comprises at least 1 wt-%, preferably at least 5 wt-%, more preferably at least 10 wt-%, and even more preferably at least 20 wt-% fossil naphtha.

16. The blend according to any of aspects 13 to 15, wherein the blend contains at most 99 wt-%, preferably at most 95 wt-%, more preferably at most 90 wt-%, and even more preferably at most 80 wt-% fossil naphtha.

17. A mixture of hydrocarbons obtainable by the method according to any of aspects 1-12.

18. Use of the mixture of hydrocarbons according to aspect 17 for producing chemicals and/or polymers, such as polypropylene and/or polyethylene.

The invention claimed is:

1. A blend for producing a mixture of hydrocarbons by thermal cracking, the blend comprising:
   a renewable paraffin composition and fossil naphtha,
   wherein the renewable paraffin composition contains more than 70 wt-% isoparaffins, the isoparaffins contain more than 20 wt-% multiple branched isoparaffins.

2. The blend according to claim 1, wherein a ratio of a wt-% amount multiple branched isoparaffins of the renewable paraffin composition to combined wt-% amounts of n-paraffins and monobranched isoparaffins of the renewable paraffin composition is at least 0.30.

3. The blend according to claim 1, wherein the blend comprises:
   at least 1 wt-% and at most 99 wt-% fossil naphtha.

4. The blend according to claim 1, wherein the ratio of the wt-% amount isoparaffins of the renewable paraffin composition to the wt-% amount of n-paraffins of the renewable paraffin composition is at least 4.0.

5. The blend according to claim 1, wherein the ratio of the wt-% amount isoparaffins of the renewable paraffin composition to the wt-% amount of n-paraffins of the renewable paraffin composition is at least 2.5.

6. The blend according to claim 3, wherein the isoparaffin content of the renewable paraffin composition is in a range from 73 wt-% to 95 wt-%.

7. The blend according to claim 3, wherein the total amount of isoparaffins in the renewable paraffin composition being more than 70 wt-% and the total amount of paraffins in the renewable paraffin composition being at least 90 wt-%.

8. The blend according to claim 1, wherein the renewable paraffin composition contains at least 75 wt-% isoparaffins.

9. The blend according to claim 1, wherein the renewable paraffin composition contains at least 80 wt-% isoparaffins.

10. The blend according to claim 1, wherein the renewable paraffin composition contains at least 25 wt-% multiple branched isoparaffins.

11. The blend according to claim 1, wherein the renewable paraffin composition contains at least 35 wt-% multiple branched isoparaffins.

12. The blend according to claim 1, wherein the renewable paraffin composition contains at least 90 wt-% paraffins.

13. The blend according to claim 1, wherein the renewable paraffin composition contains at least 95 wt-% paraffins.

14. The blend according to claim 1, wherein the renewable paraffin composition contains at least 99 wt-% paraffins.

15. The blend according to claim 1, wherein the blend contains at least 1 wt-% fossil naphtha, a sum of wt-% amounts of the renewable paraffin composition and of the fossil naphtha in the blend being selected to contain at least 90 wt-%, of a total weight of the blend.

16. The blend according to claim 1, wherein the blend comprises at least 10 wt-% fossil naphtha.

17. The blend according to claim 1, wherein the blend comprises at least 20 wt-% fossil naphtha.

18. The blend according to claim 1, wherein the renewable paraffin composition and the fossil naphtha form one liquid phase above a pour point of the blend.

19. The blend according to claim 1, wherein the renewable paraffin composition includes at least one of a heavy fraction having a boiling point ranging from 180 to 360° C. and a light fraction having a boiling point ranging from 30 to 180° C., and wherein the blend includes the heavy fraction and/or the light fraction.

20. The blend according to claim 1, wherein the renewable paraffin composition is selected from one of fractions A and B, wherein;
fraction A comprises more than 50 wt-% $C_{10}$-$C_{20}$ hydrocarbons, the content of even-numbered hydrocarbons in the $C_{10}$-$C_{20}$ range being more than 50 wt-%, and the fraction A containing at most 1.0 wt-% aromatics, and less than 2.0 wt-% olefins, and less than 10 wt-% naphthenes; and
fraction B comprises more than 50 wt-% $C_5$-$C_{10}$ hydrocarbons, and the fraction B containing at most 1.0 wt-% aromatics, and less than 2.0 wt.-% olefins, and less than 10 wt-% naphthenes.

* * * * *